United States Patent
Pinho et al.

(10) Patent No.: US 10,663,085 B2
(45) Date of Patent: May 26, 2020

(54) SUBSEA PIPELINE STATION

(71) Applicant: ONESUBSEA IP UK LIMITED, London (GB)

(72) Inventors: Adriano F. Pinho, Cypress, TX (US); Akshay Kalia, Houston, TX (US)

(73) Assignee: ONESUBSEA IP UK LIMITED, Houston, TX (US)

( * ) Notice: Subject to any disclaimer, the term of this patent is extended or adjusted under 35 U.S.C. 154(b) by 518 days.

(21) Appl. No.: 15/220,342

(22) Filed: Jul. 26, 2016

(65) Prior Publication Data
US 2018/0031146 A1 Feb. 1, 2018

(51) Int. Cl.
| | |
|---|---|
| F16L 1/26 | (2006.01) |
| F16L 55/46 | (2006.01) |
| F16L 1/16 | (2006.01) |
| E21B 37/04 | (2006.01) |
| E21B 41/00 | (2006.01) |
| F16L 55/40 | (2006.01) |
| E21B 43/01 | (2006.01) |
| F16L 1/20 | (2006.01) |
| F16L 55/38 | (2006.01) |

(52) U.S. Cl.
CPC .............. *F16L 1/161* (2013.01); *E21B 37/04* (2013.01); *E21B 41/0007* (2013.01); *E21B 43/01* (2013.01); *F16L 1/20* (2013.01); *F16L 1/26* (2013.01); *F16L 55/38* (2013.01); *F16L 55/40* (2013.01); *F16L 55/46* (2013.01)

(58) Field of Classification Search
CPC ... F16L 1/26; F16L 1/161; F16L 55/26; F16L 55/265; F16L 55/28; F16L 55/38; F16L 55/40; F16L 55/44; F16L 55/46
USPC .......................... 405/169, 170; 166/344–347
See application file for complete search history.

(56) References Cited

U.S. PATENT DOCUMENTS

| | | | | |
|---|---|---|---|---|
| 4,574,830 | A * | 3/1986 | Rickey | B08B 9/04 137/242 |
| 5,437,302 | A * | 8/1995 | Da Silva | B08B 9/053 137/242 |
| 7,669,659 | B1 * | 3/2010 | Lugo | E21B 36/003 137/155 |
| 8,616,074 | B2 | 12/2013 | Kearns et al. | |
| 8,813,770 | B2 | 8/2014 | Parsinejad et al. | |
| 8,950,498 | B2 | 2/2015 | Parsinejad et al. | |
| 2004/0231081 | A1 * | 11/2004 | Cafaro | F16L 55/46 15/104.062 |
| 2007/0012451 | A1 * | 1/2007 | O'Neill | E21B 17/01 166/367 |
| 2007/0095401 | A1 * | 5/2007 | Webster | F16K 17/10 137/488 |

(Continued)

OTHER PUBLICATIONS

European Extended Search Report for EP Application No. 17182538.3 dated Dec. 1, 2017; 8 pgs.

*Primary Examiner* — Benjamin F Fiorello
*Assistant Examiner* — Stacy N Lawson

(57) ABSTRACT

A subsea pipeline system may include a subsea pipeline station configured to establish fluid communication between a first pipeline and a second pipeline. The first pipeline may have a first diameter, and the second pipeline may have a second diameter different from the first diameter. Additionally, the subsea pipeline station may be configured to removably couple to one or more pig launching assemblies having different configurations.

20 Claims, 14 Drawing Sheets

(56) References Cited

U.S. PATENT DOCUMENTS

| | | | |
|---|---|---|---|
| 2009/0020288 A1* | 1/2009 | Balkanyi | B08B 9/055 |
| | | | 166/302 |
| 2009/0223672 A1* | 9/2009 | Naik | F16L 55/46 |
| | | | 166/344 |
| 2011/0127029 A1* | 6/2011 | Ganelin | E21B 17/01 |
| | | | 166/86.2 |
| 2012/0090414 A1 | 4/2012 | Kearns et al. | |
| 2014/0190574 A1 | 7/2014 | Parsinejad et al. | |
| 2014/0193205 A1 | 7/2014 | Parsinejad et al. | |
| 2017/0067311 A1* | 3/2017 | Donald | E21B 33/035 |

* cited by examiner

SUBSEA PIPELINE STATION

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Drilling and production systems are typically employed to access, extract, and otherwise harvest desired natural resources, such as oil and gas, that are located below the surface of the earth. These systems may be located onshore or offshore depending on the location of the desired natural resource. When a natural resource is located offshore (e.g., below a body of water), a subsea production system may be used to extract the natural resource. Such subsea production systems may include components located on a surface vessel, such as for example a rig or platform, as well as components located remotely from the surface vessel at a subsea location, typically at or near a subterranean formation (e.g., a well) at which the resource is located.

Subsea production systems may also include or connect to subsea pipeline systems to convey fluids to or between various components of the subsea production systems. Some subsea pipeline systems may cover large distances and may cross challenging topography, such as cliffs (also referred to as escarpments or scarps), canyons, and deep regions. As a result, it may be desirable to use pipelines with varying characteristics, such as diameter, flexibility, and weight, for different portions of the subsea pipeline system.

BRIEF DESCRIPTION OF THE DRAWINGS

Various features, aspects, and advantages of the present disclosure will become better understood when the following detailed description is read with reference to the accompanying figures, wherein.

DETAILED DESCRIPTION

Figure 1:
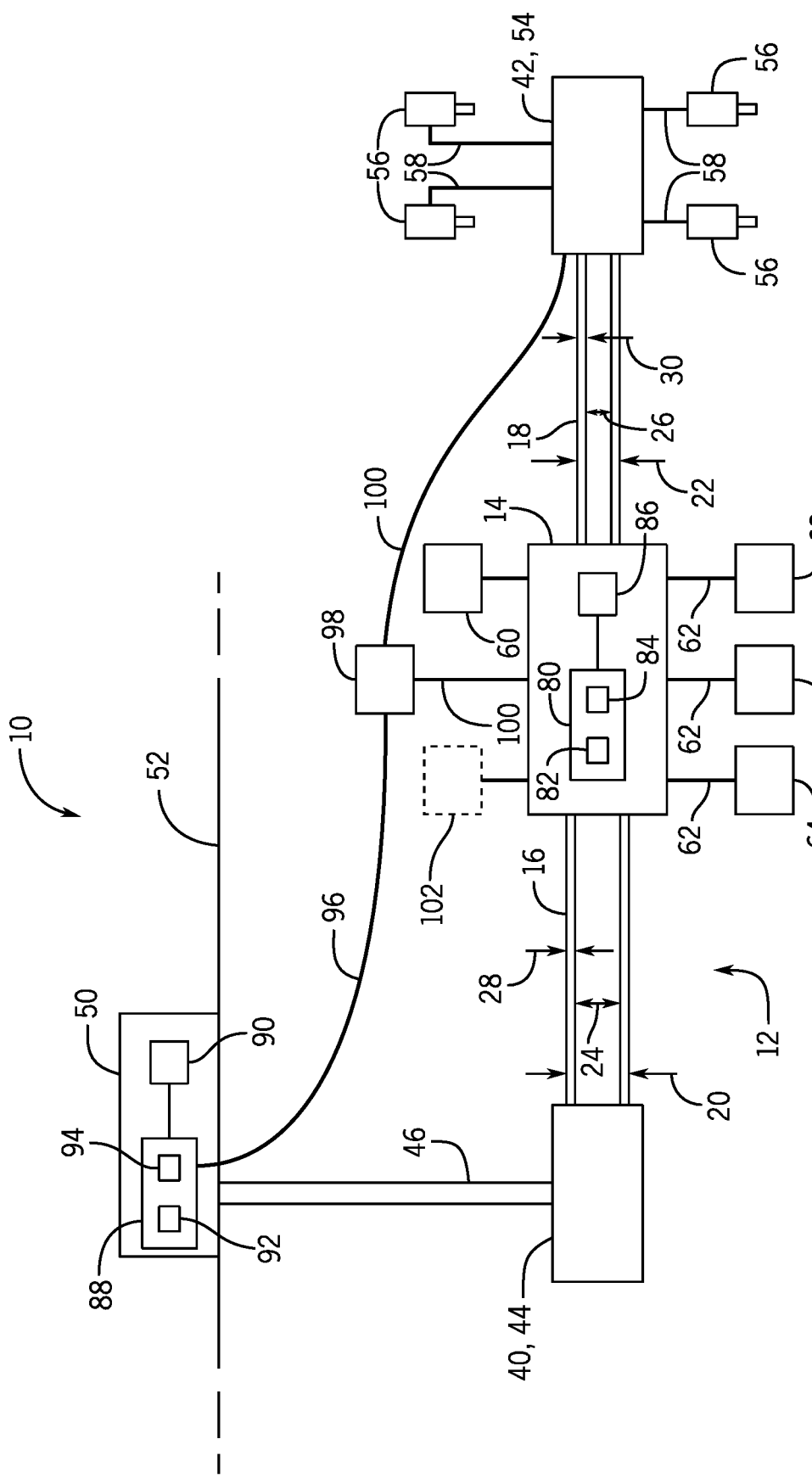
FIG. 1 is a schematic diagram of a subsea mineral extraction system including a subsea pipeline system having a subsea pipeline station, in accordance with one or more embodiments of the present disclosure.

One or more embodiments of the present disclosure will be described below. These described embodiments are only exemplary of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This discussion is directed to various embodiments of the disclosure. The drawing figures are not necessarily to scale. Certain features of the embodiments may be shown exaggerated in scale or in somewhat schematic form, and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "comprising," "including," and "having" are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Moreover, the use of "top," "bottom," "above," "below," "upper," "lower," "up," "down," "vertical," "horizontal," and variations of these terms is made for convenience, but does not require any particular orientation of these components.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

The present disclosure relates to a subsea mineral extraction system, e.g. a fluids production or injection system, that includes a subsea pipeline system including one or more pipes to convey or route fluids to various components of the subsea mineral extraction system. In some situations, it may be desirable to use pipelines with varying characteristics, such as diameter, flexibility, and weight, for different portions of the subsea pipeline system. For example, it may be desirable to use a flexible pipeline when conveying a fluid over challenging terrain, such as a scarp or canyon, or other terrain of varying topography. Further, it may be desirable to use a pipeline with a large diameter when conveying a fluid over a great distance. Further, the weight of a pipeline may increase the difficulty of installing the pipeline in deep waters, and as a result, it may be desirable to use a pipeline with a lower weight when conveying a fluid through deep waters.

Additionally, it may be desirable to provide pigs for the pipelines of the subsea pipeline system. As used herein, a "pig" (noun) refers to a tool that may be inserted into a pipeline to perform maintenance (e.g., cleaning), monitoring (e.g., inspection) operations, and/or repair operations for the pipeline, and to "pig" (verb) is the act of using a pig (noun) to negotiate the internal bore of a pipeline. Conventional pipeline systems typically employ a more or less constant bore. However, it may be difficult to pig a subsea pipeline system when the subsea pipeline system uses different types of pipelines and/or different sized pipelines. For example, it may be difficult to transition from a first pipeline with a first diameter to a second pipeline with a second diameter different from the first diameter (e.g., the first diameter and the second diameter differ by more than two standard pipeline diameters) while maintaining the piggability of both the first and second pipelines of a subsea pipeline system.

Accordingly, as discussed below, the present disclosure is generally directed to systems and methods for conveying a fluid using two or more pipelines having different characteristics, such as different diameters, different weights, different flexibilities, or any combination thereof. Specifically, the present embodiments are directed to a pipeline station (e.g., a multi-diameter pipeline station, a smart pipeline station, a pipeline crossing station, a pipeline tieback station, a subsea pipeline smart crossing system, etc.) that is configured to establish fluid communication between a first pipeline having a first characteristic and a second pipeline having a second characteristic that is different from the first characteristic. In some embodiments, the pipeline station may establish fluid communication between more than two pipelines. For example, a pipeline system of the present disclosure may be configured to convey fluid from a first pipeline having a first characteristic to a second pipeline having a second characteristic and a third pipeline having a third characteristic, where the first characteristic is different from the second and third characteristics and/or the second and third characteristics are different from each other. Further, in some embodiments, the pipeline station may establish fluid communication between two or more pipelines that have two or more different characteristics.

Additionally, as discussed below, a pipeline station of the present disclosure may establish fluid communication between two or more pipelines having different characteristics (e.g., different diameters) while maintaining the piggability of the two or more pipelines. Further, in some embodiments, the pipeline station may removably couple to two or more pig assemblies having different configurations. For example, the pipeline station may removably couple to a first pig launching and receiving assembly (e.g., a pig launching assembly, a conventional pig assembly) including a pig receiver configured to receive a first pig having a first fixed diameter and including a pig launcher configured to launch a second pig having a second fixed diameter different from the first fixed diameter. Additionally, the pipeline station may removably couple to a second pig launching and receiving assembly configured to receive and launch one or more pigs (e.g., pig assemblies) that each have a dynamic or variable diameter.

Further, as discussed below, a pipeline station of the present disclosure may provide an interface for various components configured to modify one or more parameters of a fluid flowing through the pipeline station. For example, the pipeline station may couple to a chemical injection unit configured to inject chemicals into the fluid, a boosting module configured to increase the pressure of the fluid, a high-integrity pressure protection system (HIPPS) configured to reduce the pressure of the fluid, or any combination thereof. Still further, as discussed below, the pipeline station may be configured to selectively route fluids to the pig launching and receiving assembly and/or to other components that may be coupled to the pipeline station, such as a boosting module or HIPPS.

FIG. 1 is a schematic diagram of an embodiment of a subsea mineral extraction system 10 including a subsea pipeline system 12. The subsea mineral extraction system 10 may be configured to extract minerals, such as oil, gas, and/or hydrocarbons, from the earth and/or to inject substances, such as chemicals, water, and/or cement, into the earth. The subsea pipeline system 12 may include a plurality of pipelines to establish fluid communication between various components of the subsea mineral extraction system 10, such as for example base vessels, subsea wellhead assemblies, Christmas trees, manifolds, one or more retrievable or fixed apparatuses for subsea processing (e.g., pumps, booster pumps, process fluid turbines, compressors, separators, gas separation apparatus, water separation apparatus, solids separation apparatus; hydrocarbon separation apparatus, chokes, chemical injection apparatus, gas or steam injection apparatus, fluid risers, sampling apparatus, measurement apparatus, temperature measurement apparatus, flow rate measurement apparatus, constitution measurement apparatus, consistency measurement apparatus, injection water electrolysis equipment, and the like), or any combination thereof. As discussed below, the subsea pipeline system 12 may include at least one subsea pipeline station 14 (e.g., a multi-diameter pipeline station, a smart pipeline station, a pipeline crossing station, a scarp crossing station, a subsea pipeline smart crossing system, a tieback station, etc.) that is configured to establish fluid communication between two or more pipelines having different characteristics, such as different outer diameter, inner diameter, wall thickness, flexibility, rigidity, weight, and/or material composition, and that allows for the pigging of the two or more pipelines.

As illustrated, the subsea pipeline station 14 may be configured to establish fluid communication between a first pipeline 16 (e.g., functional line, pipe, conduit, riser, etc.) and a second pipeline 18 (e.g., functional line, pipe, conduit, riser, etc.). That is, the subsea pipeline station 14 may be configured to convey (e.g., route, direct, flow, transport, transfer, etc.) fluid from the first pipeline 16 to the second pipeline 18, to convey fluid from the second pipeline 18 to the first pipeline 16, or both. Thus, in embodiments, the first pipeline 16 and the second pipeline 18 may be in series. While the subsea pipeline station 14 establishes fluid communication between two pipelines in the illustrated embodiment, the subsea pipeline station 14 may receive fluid from any suitable number of input pipelines, such as for example at least one, two, three, four, five, ten, or more, and may convey the received fluid to any suitable number of output pipelines, such as for example at least one, two, three, four, five, ten, or more. Further, while the illustrated embodiment includes one subsea pipeline station 14, the subsea pipeline system 12 may include any suitable number of subsea pipeline stations 14, such as for example at least two, three, four, five, ten, or more.

The first pipeline 16 may have at least one characteristic (e.g., parameter) that is different from at least one characteristic of the second pipeline 18. The at least one characteristic may be or include outer diameter (e.g., nominal outer diameter), inner diameter, wall thickness (e.g., nominal wall thickness), weight, flexibility, rigidity, material composition, or any combination thereof. For example, in some embodiments, the first pipeline 16 may have a first outer diameter 20, and the second pipeline 18 may have a second outer diameter 22 that is different from (i.e., is less than or greater than but not equal to) the first outer diameter 20. Further, in some embodiments, the first pipeline 16 may have a first inner diameter 24, and the second pipeline 18 may have a second inner diameter 26 that is different from the first inner diameter 24. In certain embodiments, the first outer diameter 20 and/or the first inner diameter 24 may be at least approximately 1.1, 1.2, 1.3, 1.4, 1.5, 2, 3, 4, 5, 6, 7, 8, 9, or 10 times greater than the second outer diameter 22 and/or the second inner diameter 26, respectively. In some embodiments, the first outer diameter 20 and/or the first inner diameter 24 may be between approximately 110% and approximately 750%, approximately 125% and approximately 500%, or approximately 150% and 300% of the second outer diameter 22 and/or the second inner diameter 26, respectively.

In some embodiments, the first pipeline 16 may have a first average wall thickness 28, and the second pipeline 18 may have a second average wall thickness 30 that is different from the first average wall thickness 28. For example, in some embodiments, the first wall thickness 28 may be at least approximately 1.1, 1.2, 1.3, 1.4, 1.5, 1.6, 1.7, 1.8, 1.9, 2, 2.5, 3, 3.5, or 4 times greater than the second wall thickness 30. Additionally or alternatively, the first pipeline 16 may have a first weight, and the second pipeline 18 may have a second weight that is different from the first weight. In some embodiments, the first weight may be at least approximately 1.5, 2, 3, 5, 4, 10, 15, or 25 times greater than the second weight.

Further, in some embodiments, the first pipeline 16 may be a rigid pipeline, and the second pipeline 18 may be a flexible pipeline, or vice versa. The rigid pipeline may be a metal pipeline (e.g., a steel pipeline) or a bonded composite material (e.g., fiber-reinforced plastic, fiber-reinforced thermoplastic, and/or fiber-reinforced polymer). The flexible pipeline may be an engineered pipeline, such as a bonded flexible pipeline, an unbonded flexible pipeline, or a multi-layered composite pipeline. In some embodiments, the minimum bending radius (MBR) of a rigid pipeline may be at least approximately 10, 15, 20, 30, 50, or 100 times greater than the MBR of a flexible pipeline.

As illustrated, the first pipeline 16 is coupled to and extends between a first component 40 of the subsea mineral extraction system 10 and the subsea pipeline station 14. Additionally, the second pipeline 18 is coupled to and extends between the subsea pipeline station 14 and a second component 42 of the subsea mineral extraction system 10. The first and second pipelines 16 and 18 may be configured to convey a production fluid (e.g., a fluid including oil, gas, and/or hydrocarbons), water, chemicals (e.g., hydrate inhibitors, surfactants, viscosity reducers, friction reducers, etc.), a dielectric fluid (e.g., oil), or any other suitable fluid to and/or from the first component 40 and the second component 42, respectively.

In the illustrated embodiment, the first component 40 of the subsea mineral extraction system 10 is a pipeline end termination (PLET) 44. The PLET 44 may be configured to couple (e.g., connect, tie-in, etc.) the first pipeline 16 to a riser 46. As illustrated, the riser 46 may couple to a base vessel 50 (e.g., a surface vessel, a production facility, a rig, a platform, etc.) at or near the sea surface 52. Additionally, in the illustrated embodiment, the second component 42 of the subsea mineral extraction system 10 is a manifold 54. The manifold 54 may be coupled at or near the earth surface or seafloor (not shown) to one or more subsea trees 56 (e.g., production trees, injection trees, horizontal trees, vertical trees, hybrid trees, etc.) via one or more jumpers 58. It should be appreciated that the first and second components 40 and 42 may be or include any suitable components of a subsea mineral extraction system 10, such as for example another subsea pipeline station 14, a subsea tree 56, the base vessel 50, a subsea processing apparatus as described above, a blowout preventer (BOP), a subsea wellhead assembly, and so forth. For example, in certain embodiments, the first pipeline 16 may be the riser 46, and the first component 40 may be the base vessel 50.

As noted above, the subsea pipeline station 14 may be configured to facilitate pigging of the first pipeline 16 and the second pipeline 18. In particular, the subsea pipeline station 14 may be configured to couple to a pig launching and receiving assembly 60 configured to launch one or more pigs into the first pipeline 16 and/or the second pipeline 18. Additionally or alternatively, the pig launching and receiving assembly 60 may be configured to receive one or more pigs from the first pipeline 16 and/or the second pipeline 18. As discussed below, in some embodiments, the subsea pipeline station 14 may be configured to removably couple to two or more pig launching and receiving assemblies 60 having different configurations.

In some embodiments, as discussed below, the subsea pipeline station 14 may provide an interface with various components of the subsea mineral extraction system 10 that is configured to modify one or more parameters of the fluid flowing through the subsea pipeline station 14, such as the composition (e.g., the material or chemical composition), pressure, temperature, or any other suitable parameter of the fluid. For example, the subsea pipeline station 14 may be removably coupled to various components via one or more pipeline branches 62. In some embodiments, the subsea pipeline station 14 may be removably coupled to a chemical injection unit 64 through one or more of the pipeline branches 62. The chemical injection unit 64 may be configured to inject (e.g., pump, convey, flow, route, direct, etc.) one or more chemicals, such as for example hydrate inhibitors, into the fluid flowing through the subsea pipeline station 14. In certain embodiments, the subsea pipeline station 14 may be removably coupled to a boosting module 66 (e.g., a pump) via two or more pipeline branches 62 (e.g., a first pipeline branch 62 routing fluid from the subsea pipeline station 14 to the boosting module 66 and a second pipeline branch 62 routing fluid from the boosting module 66 to the subsea pipeline station 14). The boosting module 66 may be configured to increase the pressure of the fluid flowing through the subsea pipeline station 14. Further, in some embodiments, the subsea pipeline station 14 may be removably coupled to a high-integrity pressure protection system (HIPPS) 68 via two or more pipeline branches 62 (e.g., a first pipeline branch 62 routing fluid from the subsea pipeline station 14 to the HIPPS 68 and a second pipeline branch 62 routing fluid from the HIPPS 68 to the subsea pipeline station 14). The HIPPS 68 may include one or more valves configured to reduce the pressure of the fluid to a desired level in the event of an overpressure situation.

As discussed below, the subsea pipeline station 14 may include a plurality of valves configured to direct and/or modify or stop the flow of fluid through the subsea pipeline station 14, through the pig launching and receiving assembly 60, and/or through the one or more pipeline branches 62. The valves may be mechanically actuated, hydraulically actuated, and/or electrically actuated. In some embodiments, actuation may be facilitated using a remotely operated vehicle (ROV), as described further below. In some embodiments, the valves may be mechanically actuated manually by a person, such as a diver.

In certain embodiments, the subsea pipeline station 14 may include a controller 80 (e.g., a subsea control module (SCM), an electronic controller unit, a control pod or the like) configured to send control signals (e.g., electrical signals, hydraulic signals, etc.) to control the actuation or position of the valves. Further, in some embodiments, the controller 80 may send control signals (e.g., acoustic signals, electrical signals, optical signals, electromagnetic signals, hydraulic signals, etc.) to the pig launching and receiving assembly 60 to control the pig launching and receiving assembly 60 and the launching of pigs from the pig launching and receiving assembly 60. The controller 80 may include a processor 82 and a memory 84 (e.g., a tangible, non-transitory computer-readable medium). The memory 84 may store instructions and steps written in software code, which may be read and executed by the processor 82 to perform the various methods and techniques described herein. In some embodiments, the subsea pipeline station 14 may include a power source 86 (e.g., a battery, a rechargeable battery, and/or one or more energy harvesting devices) configured to power the controller 80 and/or any other electronic components of the subsea pipeline station 14 and/or the pig launching and receiving assembly 60, such as electronic valves.

In some embodiments, the subsea pipeline station 14 may receive control signals and/or power from one or more external controllers and/or electronically-controlled devices. For example, the subsea mineral extraction system 10 may include a controller 88 and a power source 90 generally located at or near the base vessel 50. The controller 88 may include a processor 92 and a memory 94 (e.g., a tangible, non-transitory computer-readable medium). The memory 94 may store instructions and steps written in software code, which may be read and executed by the processor 92 to perform the various methods and techniques described herein. In particular, the controller 88 may send control signals (e.g., electrical signals, hydraulic signals, optical signals, electromagnetic signals, acoustic signals, etc.) to the subsea pipeline station 14 and/or the pig launching and receiving assembly 60 to control the subsea pipeline station 14 (e.g., the actuation or position of the valves) and/or the pig launching and receiving assembly 60 (e.g., the launching of pigs from the pig launching and receiving assembly 60). In some embodiments, the controller 80 may send control signals and/or power directly to the subsea pipeline station 14 and/or the pig launching and receiving assembly 60 wirelessly or via one or more wired lines, such as an umbilical 96. In certain embodiments, the controller 88 may send control signals, communication signals, and/or power to an intermediate assembly 98, such as an umbilical termination assembly (UTA) or a subsea distribution assembly (SDA), via the umbilical 96. The intermediate assembly 98 may distribute the control signals, communication signals, and/or power to the subsea pipeline station 14 and/or other components of the subsea mineral extraction system 10, such as the manifold 54, via one or more wired lines 100.

In some embodiments, one or more ROVs or underwater vehicles 102 may be configured to send control signals (e.g., electrical signals, hydraulic signals, optical signals, electromagnetic signals, acoustic signals, etc.) and/or power to the subsea pipeline station 14 and/or the pig launching and receiving assembly 60, for example on an as-needed basis. In particular, the underwater vehicle 102 may send control signals to the subsea pipeline station 14 and/or the pig launching and receiving assembly 60 to control the subsea pipeline station 14 (e.g., the actuation or position of the valves) and/or the pig launching and receiving assembly 60 (e.g., the launching of pigs from the pig launching and receiving assembly 60). In certain embodiments, the one or more underwater vehicles 102 may be configured to mechanically actuate the valves of the subsea pipeline station 14. The one or more underwater vehicles 102 may include an autonomous underwater vehicle (AUV) and/or a remotely operated underwater vehicle (ROV). In certain embodiments in which the one or more underwater vehicles 102 include an ROV, the ROV may be powered and controlled by the controller 88 at the base vessel 50 or any other suitable controller.

Figure 2:
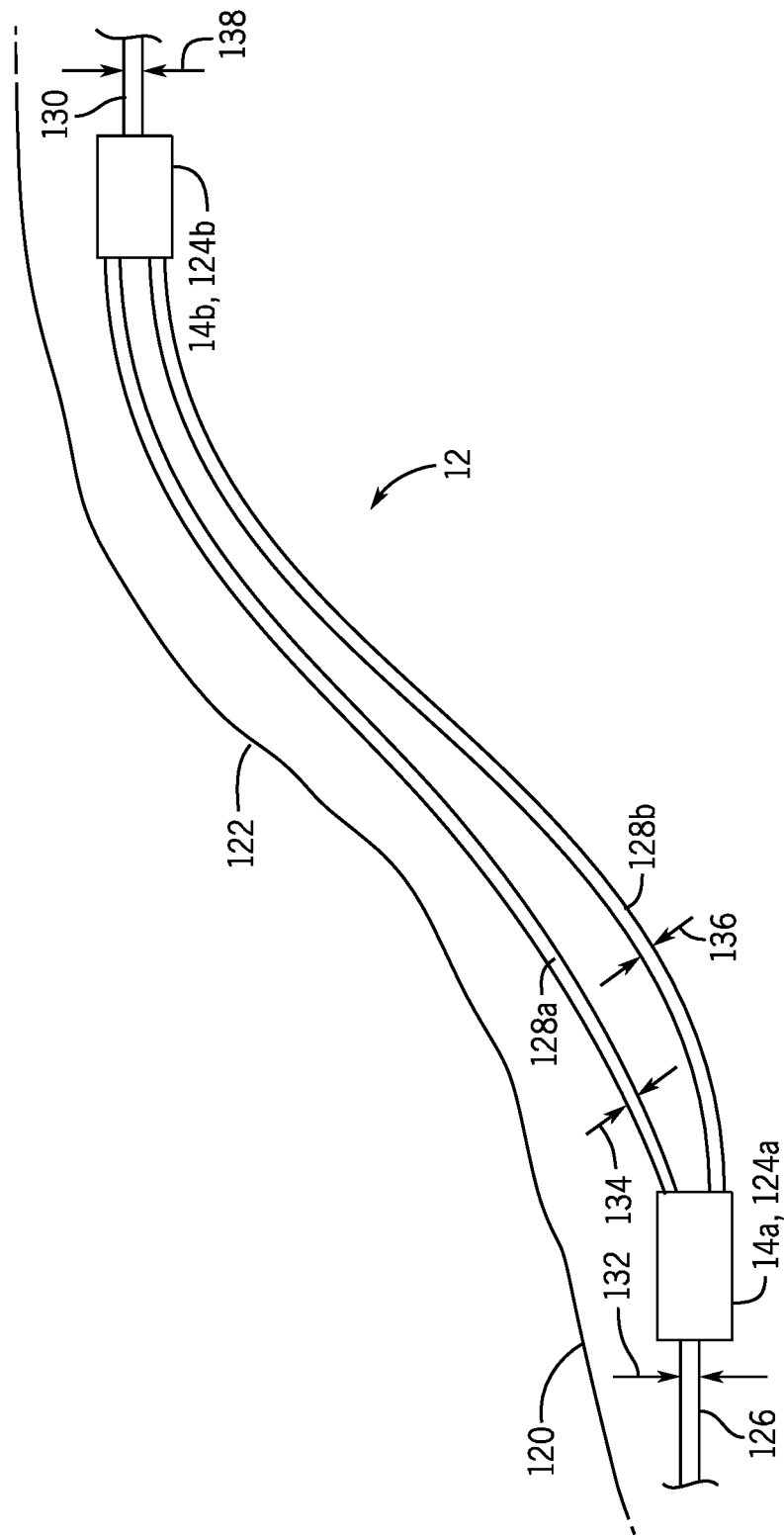
FIG. 2 is a perspective view of a subsea pipeline system including two crossing stations, in accordance with one or more embodiments of the present disclosure.

FIG. 2 illustrates a perspective view of an embodiment of the subsea pipeline system 12 including two subsea pipeline stations 14 (e.g., a first subsea pipeline station 14a and a second pipeline station 14b). As illustrated, the first and second subsea pipeline stations 14a and 14b are installed on the sea floor 120 on each side of a scarp 122 (e.g., cliff, canyon, wall, bank, slope, escarpment, topographical change, etc.). The first and second subsea pipeline stations 14a and 14b may be crossing stations 124 (e.g., a first crossing station 124a and a second crossing station 124b) configured to transition between rigid pipeline and flexible pipeline to facilitate crossing the scarp 122. In certain embodiments, the first and second crossing stations 124a and 124b may each be a pipeline end termination (PLET), an In-line Tee (ILT), an In-line SLED, or a pipeline end manifold (PLEM). Accordingly, the crossing stations 124 may also be referred to as PLET stations, ILT stations, In-line SLED stations, or PLEM stations.

In the illustrated embodiment, the first crossing station 124a is configured to establish fluid communication between a first rigid pipeline 126 and two flexible pipelines 128 (e.g., a first flexible pipeline 128a and a second flexible pipeline 128b). Additionally, as illustrated, the second crossing station 124b is configured to establish fluid communication between the first and second flexible pipelines 128a and 128b and a second rigid pipeline 130. In embodiments, the first and second flexible pipelines 128a and 128b may be in parallel with one another and in series with the first rigid pipeline 126 and the second rigid pipeline 130. As will be appreciated, the first and second crossing stations 124a and 124b may be installed on the sea floor 120 such that the first and second flexible pipelines 128a and 128b cross the scarp 122, while the first and second rigid pipelines 126 and 130 may be positioned over less challenging terrain (e.g., terrain that is smoother and/or of lesser slope than the scarp 122). Further, the crossing stations 124 may be installed along with pipeline (e.g., the first rigid pipeline 126, the flexible pipelines 128, and/or the second rigid pipeline 130) or installed as a standalone structure.

In some embodiments, the crossing stations 124 may establish fluid communication between rigid pipelines and flexible pipelines that have additional differing characteristics, such as outer diameter, inner diameter, wall thickness, weight, or any combination thereof. For example, the first rigid pipeline 126 may have a first diameter 132 (e.g., an outer diameter or an inner diameter) that is different from a second diameter 134 (e.g., an outer diameter or an inner diameter) of the first flexible pipeline 128a, and different from a third diameter 136 (e.g., an outer diameter or an inner diameter) of the second flexible pipeline 128b.

Figure 3:
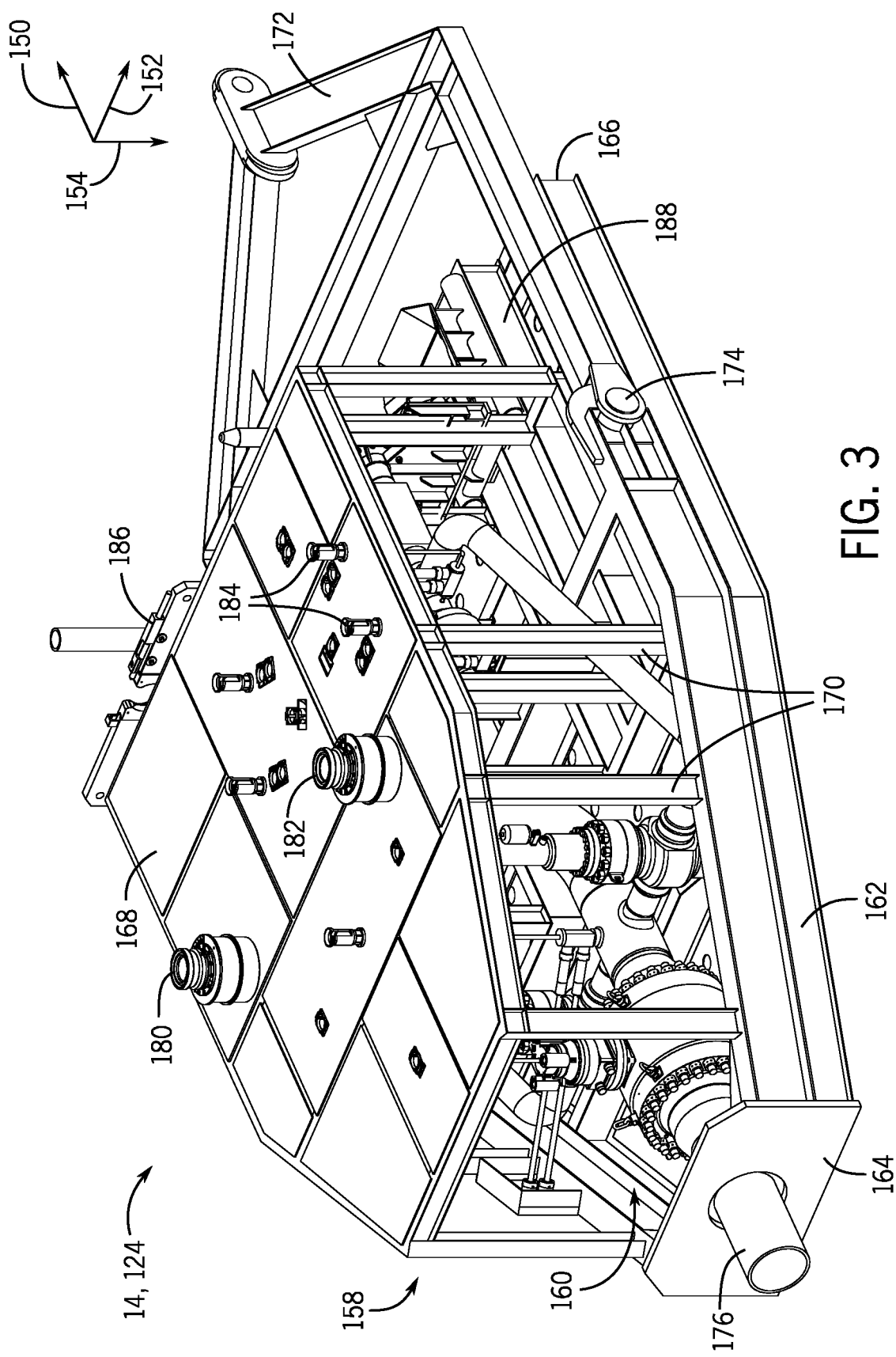
FIG. 3 is a perspective view of a crossing station including a frame and a header, in accordance with one or more embodiments of the present disclosure.

Further, the second rigid pipeline 130 may have a fourth diameter 138 (e.g., an outer diameter or an inner diameter) that is different from the second diameter 134 and/or the third diameter 136. In some embodiments, the first diameter 132 and/or the fourth diameter 138 may be at least approximately 2, 2.5, 3, 4, 5, 6, 7, 8, 9, or 10 times greater than the second diameter 134 and/or the third diameter 136. In some embodiments, the second diameter 134 and the third diameter 136 may be the same or different from one another. Further, in some embodiments, the first diameter 132 and the fourth diameter 138 may be the same or different from one another. Evaluation of whether two or more of the diameters 132, 134, 136, 138 are the same or different from each other may be based on a comparison of diameters of the same type, that is, the diameters being compared may be all outer diameters or all inner diameters, FIG. 3 illustrates a perspective view of embodiments of a crossing station 124. Throughout the following discussion, reference may be made to various axes or directions, such as a longitudinal axis or x-direction 150, a lateral axis or y-direction 152, and a vertical axis or z-direction 154. The longitudinal axis 150 may be generally parallel to the sea floor when the crossing station 124 is installed on the sea floor.

The crossing station 124 includes a frame 158 and a header 160. As discussed in more detail below in reference to FIGS. 4 and 5, the header 160 may include a plurality of conduits, valves, and connectors to route a fluid through the crossing station 124 and/or through a pig launching and receiving assembly 60. Returning to FIG. 3, the frame 158 may be configured to support the header 160 and protect the header 160 from wear and damage. The frame 158 may include a base 162 configured to be disposed on the sea floor when the crossing station 124 is installed or deployed. The base 162 may extend along a longitudinal axis 150 from a first end 164 to a second end 166. Additionally, the frame 158 may include a roof 168 disposed above the base 162 and a plurality of struts 170 (e.g., support structures, rods, bars, etc.) that each extend along a vertical axis 154 from the base 162 to the roof 168. The plurality of struts 170 may support the roof 168 and may couple to the roof 168 and to the base 162.

The frame 158 may also include a yoke 172 to facilitate installation of the crossing station 124 on the sea floor. The yoke 172 may be coupled to base 162 and may extend past the second end 166 of the base 162 along the longitudinal axis 150. In some embodiments, the yoke 172 may be coupled to the base 162 via a moveable joint 174, such as a hinge, to enable the yoke 172 to pivot with respect to the base 162. The yoke 172 may create an uprighting moment to block or prevent overturning of the crossing station 124 during installation and to enable the crossing station 124 to land in an upright position such that the base 162 is disposed on the sea floor. In some embodiments, the frame 158 may be configured to couple to one or more static buoyancy supports and/or one or more dynamic buoyancy supports.

The crossing station 124 (e.g., the header 160) may include two or more connectors to enable the crossing station 124 to couple to at least one rigid pipeline (e.g., the first rigid pipeline 126) and to at least one flexible pipeline (e.g., the first and second flexible pipelines 128a and 128b). For example, the crossing station 124 may include a first connector 176 (e.g., pipeline connector or tubular coupling) configured to couple to the first rigid pipeline 126. Additionally, in some embodiments, the crossing station 124 may include a second connector 180 (e.g., pipeline connector or tubular coupling) configured to couple to the first flexible pipeline 128a and a third connector 182 (e.g., pipeline connector or tubular coupling) configured to couple to the second flexible pipeline 128b. In some embodiments, the first connector 176 may be a pipe pup (e.g., a short piece of pipeline), which may be welded to the first rigid pipeline 126. In certain embodiments, the second and third connectors 180 and 182 may be clamp connectors, collet connectors, or any other suitable type of connector.

It should be appreciated that the connectors of the crossing station 124, such as the first, second, and third connectors 176, 180, and 182, may be disposed about any suitable location of the crossing station 124. For example, the first connector 176 may be coupled to the base 162. In some embodiments, the first connector 176 (e.g., a horizontal connector, a longitudinal connector) may be coupled to and may extend away from the first end 164 of the base 162 along the longitudinal axis 150. Further, in some embodiments, the second and third connectors 180 and 182 may be coupled to or supported by (e.g., disposed on) the roof 168.

In some embodiments, the second and third connectors 180 and 182 (e.g., vertical connectors) may be disposed on the roof 168 and may extend away from the roof 168 and the base 162 along the vertical axis 154.

Further, in certain embodiments, the crossing station 124 (e.g., the header 160) may include one or more intervention point connectors 184 (e.g., hot stab connectors). In some embodiments, the intervention point connectors 184 may couple to one or more chemical injection lines. For example, the intervention point connectors 184 may couple to one or more pipeline branches 62 that are coupled to the chemical injection unit 64, as discussed above in reference to FIG. 1. In some embodiments, the intervention point connectors 184 may be coupled to or supported by the roof 168. For example, the intervention point connectors 184 may be disposed on the roof 168 and may extend away from the roof 168 and the base 162 along the vertical axis 154. Still further, the crossing station 124 (e.g., the header 160) may include a first pig launching assembly connector 186 and a second pig launching assembly connector 188 configured to removably couple to the pig launching and receiving assembly 60. The first and second pig launching assembly connectors 186 and 188 will be described in more detail with respect to FIGS. 4-6.

Figure 4:
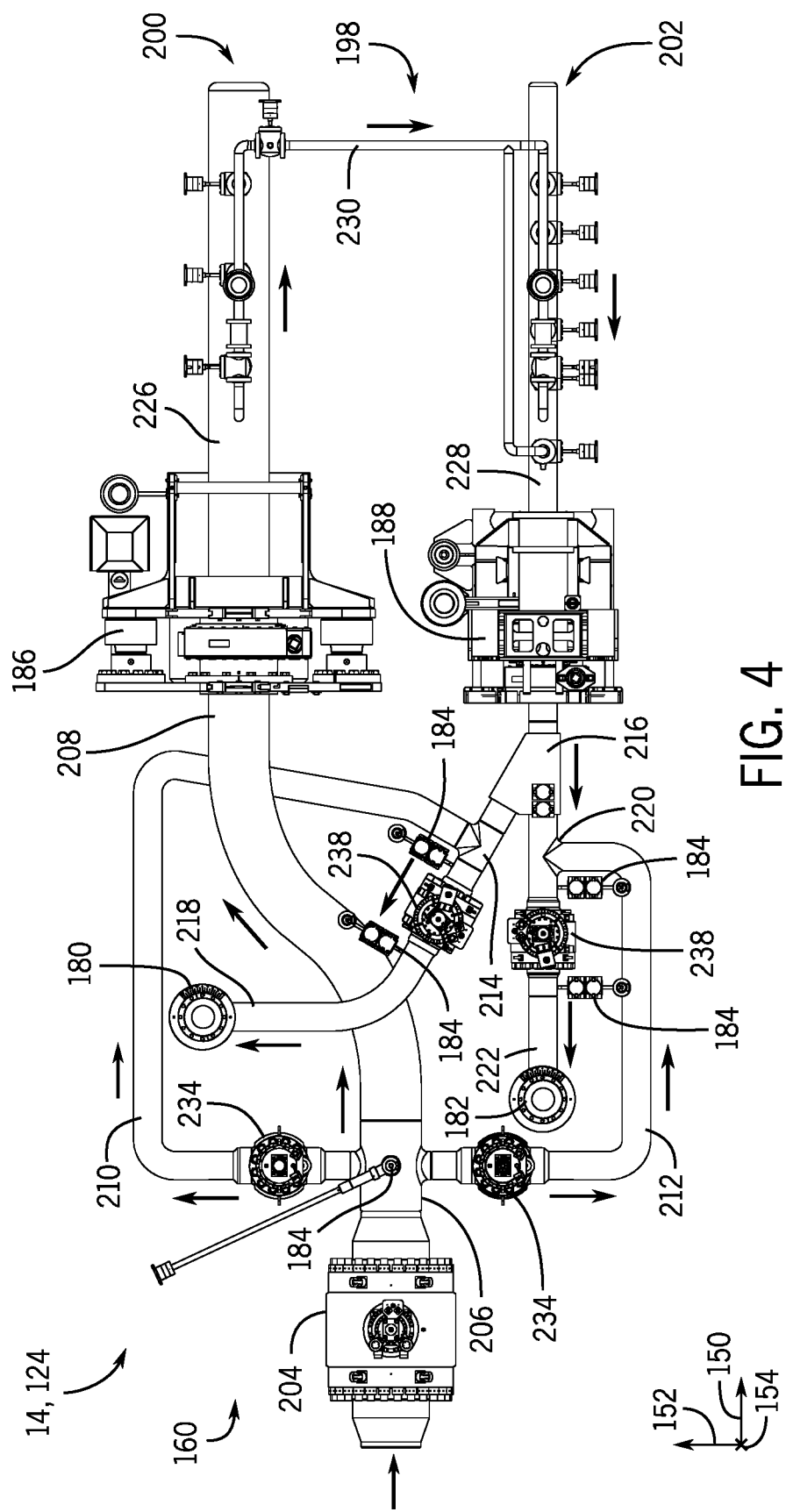
FIG. 4 is a top down view of a header of a crossing station coupled to a pig launching and receiving assembly, in accordance with one or more embodiments of the present disclosure.

FIG. 4 illustrates a top down view of embodiments of the header 160 of the crossing station 124. As illustrated, the header 160 is coupled to a first pig launching and receiving assembly 198 having a first configuration. In particular, the first pig launching and receiving assembly 198 may include a first pig launcher and receiver 200 and a second pig launcher and receiver 202. As discussed below, the first pig launcher and receiver 200 may be configured to receive and/or launch one or more pigs of a first diameter, and the second pig launcher and receiver 202 may be configured to receive and/or launch one or more pigs of a second diameter different from the first diameter.

As illustrated, the header 160 may include a first valve 204 (e.g., a ball valve, a one-way valve) configured to couple to the first connector 176 (not shown on FIG. 4). The first valve 204 may be configured to provide flow isolation by allowing fluid to flow through the first valve 204 when the first valve 204 is in an open position and by blocking or preventing the flow of fluid through the first valve 204 when the first valve 204 is in a closed position. The first valve 204 may be coupled to a first cross fitting 206 (e.g., a flow splitter), which may be coupled to first, second, and third conduits 208, 210, and 212 (e.g., lines, flow lines, pipes, pipelines, etc.).

The first conduit 208 may extend from the first cross fitting 206 to the first pig launching assembly connector 186. The first pig launching assembly connector 186 may be coupled to the first pig launcher and receiver 200 of the first pig launching and receiving assembly 198. Additionally, the second conduit 210 may extend from the first cross fitting 206 to a second cross fitting 214. The second cross fitting 214 may also be coupled to a wye diverter 216 (e.g., a wye pig diverter) and a fourth conduit 218. Similarly, the third conduit 212 may extend from the first cross fitting 206 to a third cross fitting 220. The third cross fitting 220 may also be coupled to the wye diverter 216 and a fifth conduit 222. In addition to the second and third cross fittings 214 and 220, the wye diverter 216 may also be coupled to the second pig launching assembly connector 188. The wye diverter 216 may be coupled to the second pig launching assembly connector 188 directly or via a conduit. As illustrated, the second pig launching assembly connector 188 may be coupled to the second pig launcher and receiver 202 of the first pig launching and receiving assembly 198. The fourth conduit 218 may extend from the second cross fitting 214 to the second connector 180, which may be configured to couple to the first flexible pipeline 128*a*. Additionally, the fifth conduit 222 may extend from the third cross fitting 216 to the third connector 182, which may be configured to couple to the second flexible pipeline 128*b*.

As noted above, the first and second pig launching assembly connectors 186 and 188 may be coupled to the first and second pig launchers and receivers 200 and 202, respectively. In particular, the first pig launching assembly connector 186 may be coupled to a first pig conduit 226 of the first pig launcher and receiver 200, and the second pig launching assembly connector 188 may be coupled to a second pig conduit 228 of the second pig launcher and receiver 202. Further, the first and second pig conduits 226 and 228 may be coupled to one another via a sixth conduit 230.

Additionally, FIG. 4 illustrates a plurality of arrows 240 indicating possible flow paths of fluid through the header 160 and the first pig launching and receiving assembly 198 for embodiments in which the crossing station 124 receives fluid from the first rigid pipeline 126 and conveys the received fluid to the first and second flexible pipelines 128*a* and 128*b*. It should be appreciated that the direction of the arrows 240 and the direction of fluid flow through the header 160 and the first pig launching and receiving assembly 198 will be reversed in embodiments in which the crossing station 124 receives fluid from the first and second flexible pipelines 128*a* and 128*b* and conveys the received fluid to the first rigid pipeline 126. As indicated by the arrows 240, the first valve 204 may receive fluid from the first rigid pipeline 126 (e.g., via the first connector 176 shown in FIG. 3) and may convey the fluid to the first cross fitting 206 when the first valve 204 is in the open position. The first cross fitting 206 may then split the flow between the first, second, and third conduits 208, 210, and 212. Next, the first conduit 208 may convey the fluid to the first pig conduit 226, which may convey the fluid to the sixth conduit 230. The sixth conduit 230 may then convey the fluid to the second pig conduit 228, which may then convey the fluid to the wye diverter 216. Further, the wye diverter 216 may convey the fluid to the fourth and/or fifth conduits 218 and/or 222. Additionally, the second and third conduits 210 and 212 may convey the fluid to the fourth and fifth conduits 218 and 222, respectively. Finally, the fourth and fifth conduits 218 and 222 may convey the fluid to the first and second flexible pipelines 128*a* and 128*b*, respectively.

In some embodiments, the header 160 may also include a second valve 234 disposed in each of the second and third conduits 210 and 212. Each second valve 234 (e.g., a gate valve) may enable fluid flow through the second valve 234 when the second valve 234 is in an open position and may block fluid flow through the second valve 234 when the second valve 234 is in a closed position. As such, the second valves 234 may enable the crossing station 124 to selectively route the fluid from the first cross fitting 206 to the second conduit 210, the third conduit 212, or both.

While the first and second pig launching assembly connectors 186 and 188 are coupled to the first pig launching and receiving assembly 198 in the illustrated embodiment, the first and second pig launching assembly connectors 186 and 188 may be configured to removably couple to other components, such as another pig assembly having a different configuration than the first pig launching and receiving assembly 198, pressure caps (e.g., when pigging is not desired), a boosting module 66, HIPPS 68, or any other suitable component of the subsea mineral extraction system 10. Each component may be removable from the first and second pig launching assembly connectors 186 and 188 while the crossing station 124 is installed on the sea floor. Further, after a component is removed from the first and second pig launching assembly connectors 186 and 188, a different component may be coupled to the first and second pig launching assembly connectors 186 and 188 while the crossing station 124 is installed on the sea floor. For example, the crossing station 124 may be installed with a first component (e.g., the first pig launching and receiving assembly 198), and after a period of time, the first component may be removed from the crossing station 124, and a second component (e.g., a second pig launching and receiving assembly) may be coupled to the crossing station 124 while the crossing station 124 is still on the sea floor.

However, when components are coupled to or removed from the first and second pig launching assembly connectors 186 and 188 while the crossing station 124 is installed on the sea floor, seawater potentially may flow into the conduits 208, 210, 212, 218, and 222. The first valve 204 may reduce, block, or prevent seawater from flowing from the conduits 208, 210, and 212 into the first rigid pipeline 126 at least when the first valve 204 is in the closed position. In some embodiments, the first valve 204 may be a one-way valve and may be installed in the crossing station 124 such that the first valve 204 may reduce, block, or prevent fluid flow from the conduits 208, 210, and 212 to the first rigid pipeline 126 when the first valve 204 is in the open position and the closed position.

Additionally, to reduce, block, or prevent seawater from flowing from into the first and second flexible pipelines 128a and 128b, the header 160 may include a third valve 238 disposed in each of the fourth and fifth conduits 218 and 222. Each third valve 238 (e.g., a ball valve) may enable fluid flow through the third valve 238 to the first or second flexible pipelines 128a or 128b when the third valve 238 is in an open position and may reduce, block, or prevent fluid flow through the third valve 238 to the first or second flexible pipelines 128a or 128b when the third valve 238 is in a closed position. Further, in an event that the first rigid pipeline 126, the first flexible pipeline 128a, and/or the second flexible pipeline 128b are removed from the crossing station 124 while the crossing station 124 is installed on the seafloor, the first valve 204 and the third valves 238 may also be configured to reduce, block, or prevent seawater from flowing from the connectors 176, 180, and/or 182 into the conduits 208, 210, 212, 218, and 222 when the first valve 204 and the third valves 238 are in the open position and/or the closed position.

In some embodiments, the intervention point connectors 184 may be coupled to one or more devices configured to flush seawater (or another fluid) from the conduits 208, 210, 212, 218, and/or 222. As illustrated, in some embodiments, the crossing station 124 may include an intervention point connector 184 on either side of each third valve 238. Additionally, the crossing station 124 may include an intervention point connector 184 (e.g., fluid port or coupling) proximate to the first valve 204. For example, the crossing station 124 may include an intervention point connector 184 disposed in the first cross fitting 206. Additionally, as noted above, the intervention point connectors 184 may also be configured to couple to one or more chemical injection lines to inject chemicals into the fluid. In some embodiments, each injection connector 184 may include a valve (e.g., a gate valve, a double block gate valve) and a hot stab.

Figure 5:
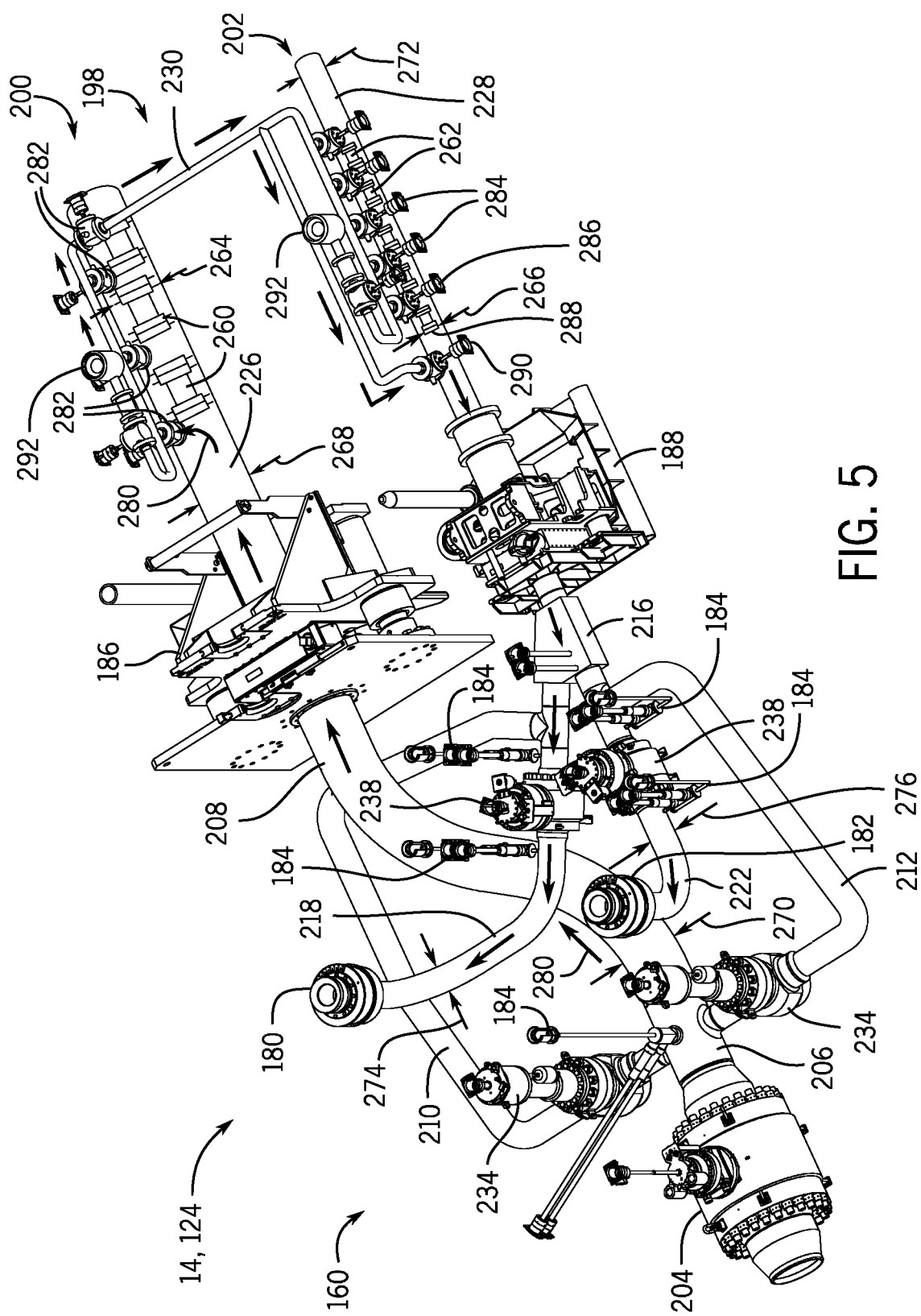
FIG. 5 is a schematic view of a header of a crossing station coupled to a pig launching and receiving assembly that includes first pigs and second pigs, in accordance with one or more embodiments of the present disclosure.

FIG. 5 is a schematic of an embodiment of the header 160 of the crossing station 124 coupled to the first pig launching and receiving assembly 198, illustrating one or more first pigs 260 and one or more second pigs 262 of the first pig launching and receiving assembly 198. As discussed below, the first pig launching and receiving assembly 198 may be configured to launch the one or more first pigs 260 into the first rigid pipeline 126 or to launch the one or more second pigs 262 into the first flexible pipeline 128a or the second flexible pipeline 128b based on the flow of fluid through the header 160 and the first pig launching and receiving assembly 198. Accordingly, the first pigs 260 may be sized to fit within the first rigid pipeline 126, and the second pigs 262 may be sized to fit within the first and second flexible pipelines 128a and 128b. In particular, each first pig 260 may have a first pig diameter 264 (e.g., maximum diameter) sized to fit within the first rigid pipeline 126, and each second pig 262 may have a second pig diameter 266 (e.g., maximum diameter) sized to fit within the first and second flexible pipelines 128a and 128b.

In some embodiments, each first pig 260 and each second pig 262 may be sized to contact the pipe wall of the respective pipeline. That is, the first pig diameter 264 may be greater than the first diameter 132 (e.g., an inner diameter) of the first rigid pipeline 126, and the second pig diameter 266 may be greater than the second and third diameters 134 and 136 (e.g., inner diameters) of the first and second flexible pipelines 128a and 128b. For example, the pig (e.g., a first pig 260 and/or a second pig 262) may include one or more regions that are constructed from resilient or deformable materials, such as foam or a wire brush, and the deformable regions may be configured to deform (e.g., resiliently deform) when the pig is inserted into a pipeline to reduce the diameter of the pig. In some embodiments, the first pig diameter 264 may be greater than the first diameter 132 of the first rigid pipeline 126 by at least approximately 25%, 20%, 15%, 10%, 5%, 4%, 3%, 2%, 1%, or any other suitable percentage of the first diameter 132. Similarly, the second pig diameter 266 may be greater than the second and third diameters 134 and 136 by at least approximately 25%, 20%, 15%, 10%, 5%, 4%, 3%, 2%, 1%, or any other suitable percentage of the second and third diameters 134 and 136, respectively.

In certain embodiments, the first and second pig diameters 264 and 266 may be static, fixed, or constant diameters. As used herein, the terms "static," "fixed," and "constant," or any other similar terms used to describe a diameter of a pig are intended to mean that the pig diameter does not change or only changes by a small or negligible amount (e.g., decreases by 25%, 20%, 15%, 10%, 5%, 4%, 3%, 2%, or 1% of the original pig diameter) provided that the pig is not damaged. Further, as used herein, the terms "dynamic," "variable," or any other similar terms used to describe a diameter of a pig are intended to mean that the pig diameter is configured to change (e.g., decrease and/or increase) by a significant amount (e.g., changes by ±30%, ±35%, ±40%, ±45%, ±50%, ±60%, ±70%, ±80%, ±90%, ±100%, ±150%, ±200%, ±250%, ±300%, or more of the original pig diameter) provided that the pig is not damaged. Pigs having a dynamic or variable diameter will be described in more detail below with reference to FIGS. 7 and 8.

Further, various components of the header 160 and the first pig launching and receiving assembly 198 may be sized to accommodate the first pigs 260 and/or the second pigs 262. For example, in some embodiments, the first pig diameter 264 may be greater than a diameter 268 (e.g., an inner diameter) of the first pig conduit 226, a diameter 270

(e.g., an inner diameter) of the first conduit 208, and the inner diameters (not shown) of the first valve 204, the first cross fitting 206, the first pig launching assembly connector 186, and the first connector 176 by approximately 25%, 20%, 10%, 15%, 5%, 4%, 3%, 2%, 1%, or any other suitable percentage of the respective diameter. In certain embodiments, the second pig diameter 266 may be greater than a diameter 272 (e.g., an inner diameter) of the second pig conduit 228, a diameter 274 (e.g., an inner diameter) of the fourth conduit 218, a diameter 276 (e.g., an inner diameter) of the fifth conduit 222, and the inner diameters and dimensions (not shown) of the first pig launching assembly connector 186, the second and third connectors 180 and 182, and the wye diverter 216 by approximately 25%, 20%, 15%, 10%, 5%, 4%, 3%, 2%, 1%, or any other suitable percent of the respective diameter. Further, in some embodiments, the diameters 270 and 272 of the first and second pigs conduits 226 and 228, respectively, may each be substantially constant (e.g., within manufacturing tolerances) over the length of the respective conduit.

As noted above, the first pig launching and receiving assembly 198 may be configured to launch a first pig 260 into the first rigid pipeline 126 or to launch a second pig 262 into the first flexible pipeline 128a or the second flexible pipeline 128b based on the flow of fluid through the header 160 and the first pig launching and receiving assembly 198. In particular, for embodiments in which the header 160 conveys fluid from the first rigid pipeline 126 to the first flexible pipeline 128a and the second flexible pipeline 128b as indicated by the arrows 280, the first pig launching and receiving assembly 198 may be configured to receive a first pig 260 from the first rigid pipeline 126 and to launch a second pig 262 into the first flexible pipeline 128a or the second flexible pipeline 128b. In such embodiments, the first pig launcher and receiver 200 may be referred to as a pig receiver, and the second pig launcher and receiver 202 may be referred to as a pig launcher.

Alternatively, for embodiments in which the header 160 conveys fluid from the first flexible pipeline 128a and the second flexible pipeline 128b to the first rigid pipeline 126, the first pig launching and receiving assembly 198 may be configured to launch the one or more first pigs 260 into the first rigid pipeline 126 and to receive one or more second pigs 262 from the first flexible pipeline 128a or the second flexible pipeline 128b. In such embodiments, the first pig launcher and receiver 200 may be referred to as a pig launcher, and the second pig launcher and receiver 202 may be referred to as a pig receiver. It should be appreciated that the first and second pig launchers and receiver 200 and 202 may each have the capability to both receive and launch pigs to facilitate pigging of the first rigid pipeline 126, the first flexible pipeline 128a, and the second flexible pipeline 128b for both directions of fluid flow through the crossing station 124.

In some embodiments, the first connector 176 may receive fluid and one or more first pigs 260 from the first rigid pipeline 126, and the fluid and the one or more first pigs 260 may be routed through the first valve 204 and the first conduit 208 to the first pig launching assembly connector 186. In some embodiments, the valves 234 in the second and third conduits 210 and 212 may be closed to direct the full flow of the fluid through the first pig launching and receiving assembly 198. The first pig launching assembly connector 186 may receive the fluid and the first pigs 260 from the first conduit 208 and may convey the fluid and the first pigs 260 to the first pig conduit 226 of the first pig launcher and receiver 200 (e.g., the pig receiver). The first pig conduit 226 may house or contain the one or more first pigs 260. Additionally, fluid may flow from the first pig conduit 226 to the second pig conduit 228 via the sixth conduit 230. However, the first pigs 260 may not flow from the first pig conduit 226 to the second pig conduit 228.

Further, the pig launcher 202 may be configured to launch one or more second pigs 262 housed in the second pig conduit 228. In particular, the pig launcher 202 may route fluid and the second pigs 262 through the second pig launching assembly connector 188, which may then route the fluid and the second pigs 262 to the wye diverter 216. The wye diverter 216 may be configured to route the second pigs 262 to either the fourth conduit 218 or the fifth conduit 222 based on the position of the wye diverter 216. In some embodiments, the wye diverter 216 may route the fluid to both the fourth and fifth conduits 218 and 222. Finally, the second pigs 262 may be routed to the first flexible pipeline 128a or to the second flexible pipeline 128b via the fourth conduit 218 and the second connector 180 or via the fifth conduit 222 and the third connector 182.

The first pig launching and receiving assembly 198 may also include a plurality of valves to control the flow of fluid through the first pig launching and receiving assembly 198 and to control the launching of pigs (e.g., the second pigs 262). In particular, the first pig launcher and receiver 200 may include a first plurality of valves 282 configured to enable or block fluid communication between the first pig conduit 226 and the sixth conduit 230. For example, when at least one valve 282 of the first plurality of valves 282 is in an open position, fluid may flow from the first pig conduit 226 to the sixth conduit 230, as illustrated by the arrows 280. Further, the second pig launcher and receiver 202 may include a second plurality of valves 284 configured to enable or block fluid communication between the second pig conduit 228 and the sixth conduit 230. For example, when at least one valve 284 of the second plurality of valves 284 is in an open position, fluid may flow from the sixth conduit 230 to the second pig conduit 228, as illustrated by the arrows 280. Thus, the first and second plurality of valves 282 and 284 may enable or block fluid communication between the first pig launcher and receiver 200 (e.g., the first pig conduit 226) and the second pig launcher and receiver 202 (e.g., the second pig conduit 228).

To launch one of the second pigs 262 from the second pig launcher and receiver 202 (e.g., the pig launcher), at least one of the second plurality of valves 284 upstream (e.g., immediately upstream) from the pig 262 may be actuated to an open position. As will be appreciated, the fluid may propel the pig 262 forward to launch the pig 262 from the second pig launcher and receiver 202. Further, in order to launch only one pig of the second pigs 262 at a time, the second plurality of valves 284 may be actuated such that a valve 286 immediately upstream from a pig 288 at the downstream end of the second pigs 262 is in an open position, while any valves of the second plurality of valves 284 upstream from the valve 286 are each in a closed position. Additionally, in some embodiments, the second plurality of valves 284 may be actuated to bypass launching of the second pigs 262, while enabling fluid flow through the first pig launching and receiving assembly 198. For example, one or more valves (e.g., bypass valves) 290 of the second plurality of valves 284 that are downstream from each of the second pigs 262 in the second pig conduit 228 may be actuated to the open position, while each valve of the second plurality of valves 284 that upstream from at least one pig of the second pigs 262 may be actuated to the closed position. Further, in some embodiments, the first pig launching and receiving assembly 198 may include one or more hot stab connectors 292 (e.g., fluid ports or couplings) disposed along the sixth conduit 230 to enable venting and/or flushing of the sixth conduit 230, the first pig conduit 226, and/or the second pig conduit 228. The hot stab connectors 292 may also provide access points to connect to input lines to launch the first pigs 260 and/or the second pigs 262.

The first and second plurality of valves 282 and 284 may be mechanically actuated, hydraulically actuated, and/or electrically actuated. For example, in some embodiments, the first and second plurality of valves 282 and 284 may be mechanically actuated by a person (e.g., a diver) and/or by one of the underwater vehicles 102 (e.g., an ROV and/or an AUV). In certain embodiments, a controller (e.g., the controller 80, the controller 88, and/or a controller of the underwater vehicle 102) may be configured to control the actuation of the first and second plurality of valves 282 and 284. For example, the controller may send hydraulic control signals and/or electrical control signals to one or more valves of the first and second plurality of valves 282 and 284. Additionally, the controller may send hydraulic control signals and/or electrical control signals to actuate one or more valves of the crossing station 124, such as the valves 204, 234, and 238 and the valves of the intervention point connectors 184. Further, in some embodiments, the controller may control actuation of the first and second plurality of valves 282 and 284 to control the launching of pigs (e.g., the second pigs 262) from the first pig launching and receiving assembly 198 based on sensor feedback (e.g., optical sensor feedback, pressure sensor feedback, etc.). For example, the controller may receive sensor 1 feedback from one or more sensors of the first pig launching and receiving assembly 198 and/or from one or more sensors of the first and second pigs 260 and 262 (e.g., smart pigs). In some embodiments, the controller may send a signal to actuate a valve of the second plurality of valves 284 to cause the second pig launcher and receiver 202 to launch a pig based on sensor feedback indicating that the first pig launcher and receiver 200 received a pig.

Figure 6:
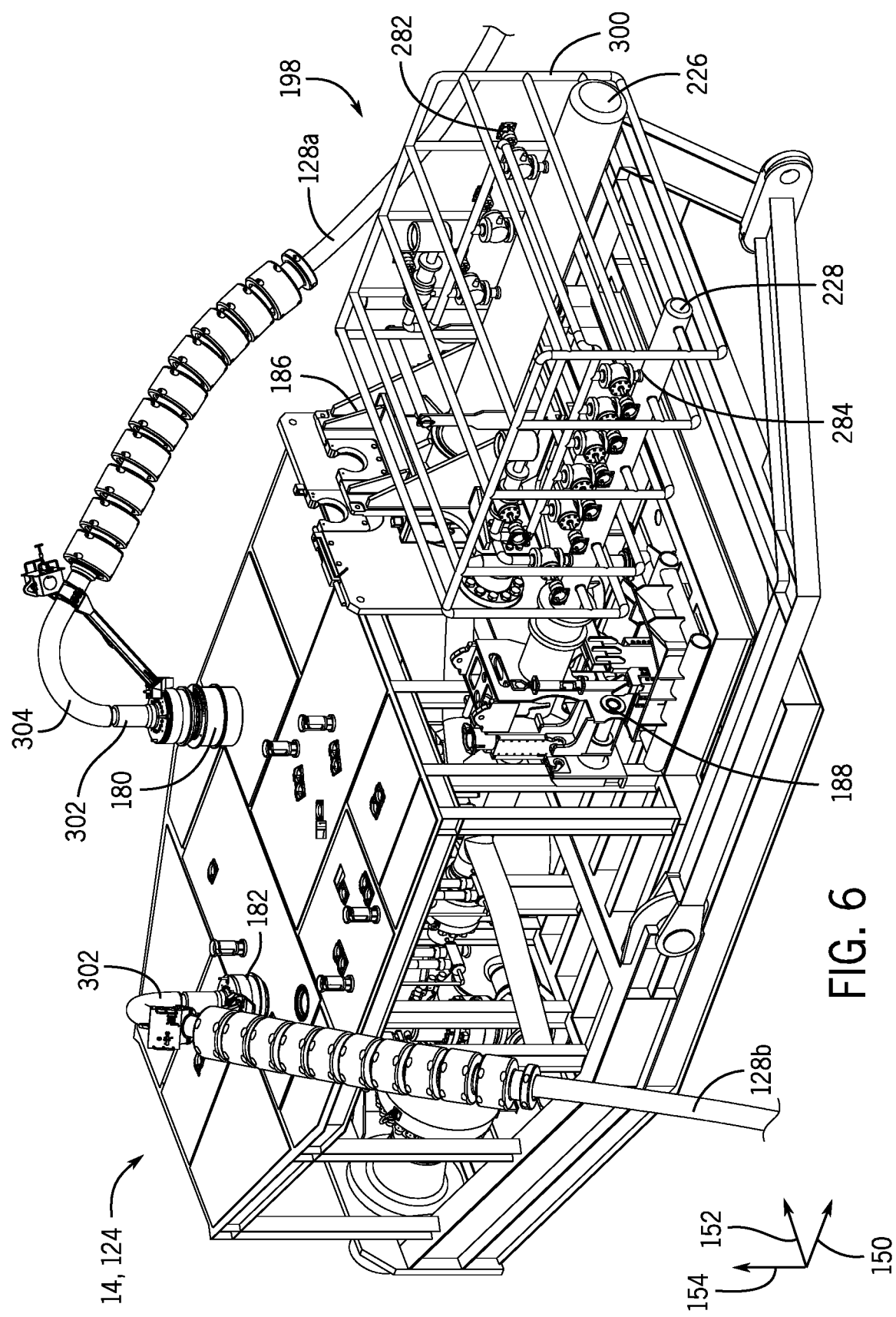
FIG. 6 is a perspective view of a crossing station coupled to a pig launching and receiving assembly, in accordance with one or more embodiments of the present disclosure.

FIG. 6 is a perspective view of an embodiment of the crossing station 124 coupled to the first pig launching and receiving assembly 198. As illustrated, the first pig launching assembly connector 186 (e.g., a horizontal connector) may be coupled to the first pig conduit 226, and the second pig launching assembly connector 188 (e.g., a horizontal connector) may be coupled to the second pig conduit 228. Further, as illustrated, in some embodiments, the first and second pig conduits 226 and 228 may extend from the first and second pig launching assembly connectors 186 and 188, respectively, along the longitudinal axis 150. Additionally, in some embodiments, the first pig launching and receiving assembly 198 may include a frame 300 surrounding the first pig conduit 226, the second pig conduit 228, the first plurality of valves 282, and the second plurality of valves 284. Further, in some embodiments, the second and third connectors 180 and 182 may be coupled to the first and second flexible pipelines 128a and 182b, respectively, via a gooseneck connector 302 that includes a curved (e.g., generally u-shaped) portion 304. As illustrated, the gooseneck connectors 302 extend away from the second and third connectors 180 and 182 along the vertical axis 154, the lateral axis 152, and/or the longitudinal axis 150.

Figure 7:
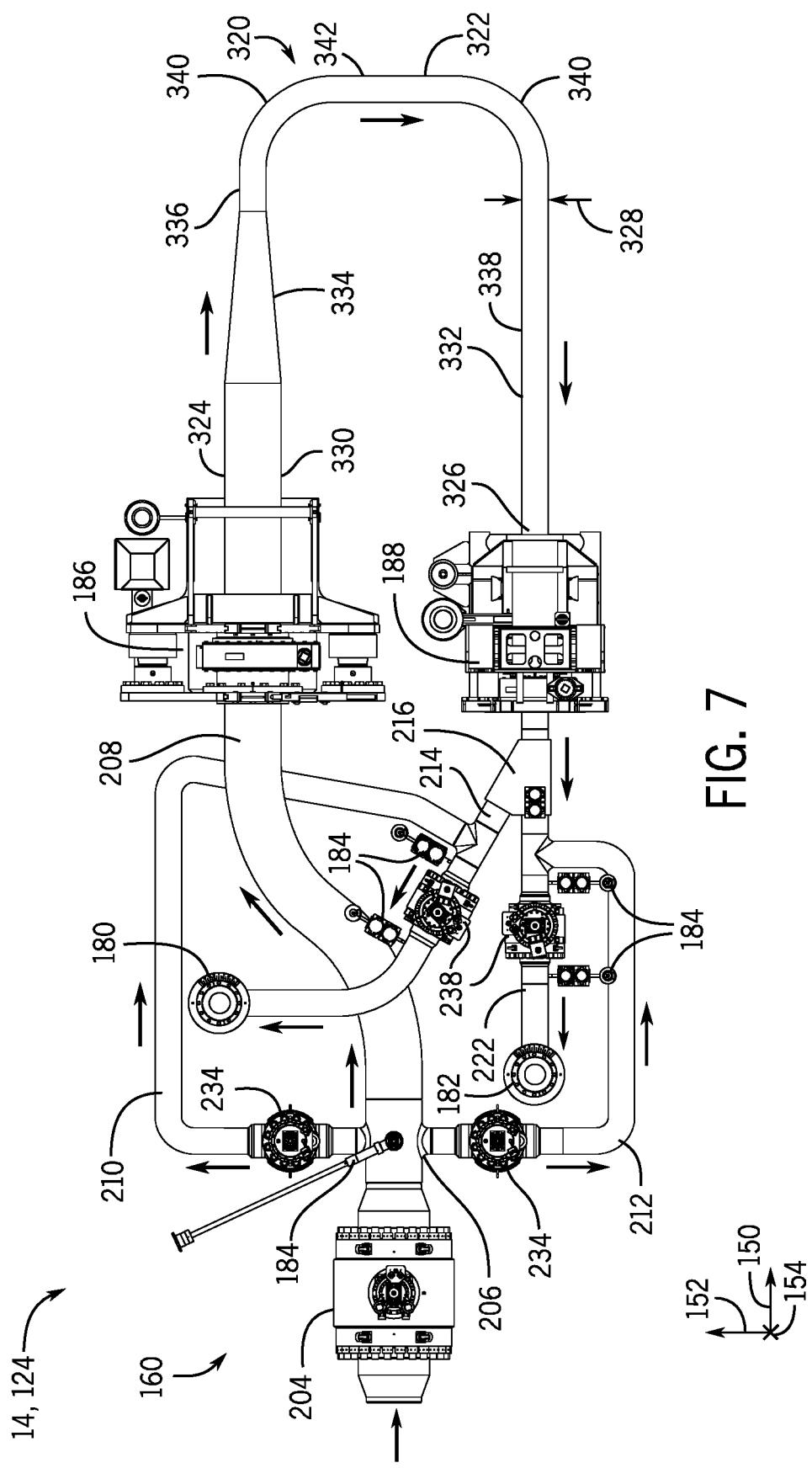
FIG. 7 is a top down view of a header of a crossing station coupled to a pig launching and receiving assembly, in accordance with one or more embodiments of the present disclosure.

FIG. 7 is a top down view of the header 160 of embodiments of the crossing station 124 coupled to a second pig launching and receiving assembly 320 having a second configuration different from the first configuration of the first pig launching and receiving assembly 198. As discussed below, the second pig launching and receiving assembly 320 may be configured to receive and/or launch one or more pigs (e.g., intelligent pigs) each having a dynamic or variable diameter. As illustrated, the second pig launching and receiving assembly 320 may include a pig conduit 322 coupled to the first and second pig launching assembly connectors 186 and 188. In particular, a first end 324 of the pig conduit 322 may be coupled to the first pig launching assembly connector 186, and a second end 326 of the pig conduit 322 may be coupled to the second pig launching assembly connector 188. In some embodiments, the second pig launching and receiving assembly 320 may only include a single conduit (i.e., the pig conduit 322) that is configured to convey pigs.

The pig conduit 322 may include a variable diameter 328 (e.g., an inner diameter) that varies from the first end 324 to the second end 326. In particular, the diameter 328 of the pig conduit 322 may vary such that the diameter 328 at the first end 324 is different from the diameter 328 at the second end 326. In some embodiments, the pig conduit 322 may include one or more transition portions where the diameter 328 changes and/or one or more constant diameter portions where the diameter 328 remains substantially constant. For example, as illustrated, the pig conduit 322 may include a first constant diameter portion 330 that extends from the first pig launching assembly connector 186, a second constant diameter portion 332 that extends from the second pig launching assembly connector 188, and a transition portion 334 that extends between the first constant diameter portion 330 and the second constant diameter portion 332. As illustrated, in some embodiments, the transition portion 334 may be a tapered annular portion (e.g., conical portion) where the diameter 328 gradually changes (e.g., gradually increases or decreases). In certain embodiments, the transition portion 334 may be a stepped portion where the diameter 328 abruptly changes. In some embodiments, the diameter 328 at the first end 324 and/or the diameter 328 of the first constant diameter portion 330 may be within approximately ±10%, ±5%, ±4%, ±3%, ±2%, or ±1% of the first diameter 132 of the first rigid pipeline 126. Further, in some embodiments, the diameter 328 at the second end 326 and/or the diameter 328 of the second constant diameter portion 332 may be within approximately ±10%, ±5%, ±4%, ±3%, ±2%, or ±1% of the second diameter 134 of the first flexible pipeline 128a and/or the third diameter 136 of the second flexible pipeline 128b.

As illustrated, the pig conduit 322 (e.g., a pig loop) may be generally shaped as a loop (e.g., curved, u-shaped, arc-shaped, etc.) to couple to both the first and second pig launching assembly connectors 186 and 188. For example, in some embodiments, the pig conduit 322 may include a first portion 336 that extends from the first end 324 of the pig conduit 322 and away from the first pig launching assembly connector 186 along the longitudinal axis 150, a second portion 338 that extends from the second end 326 of the pig conduit 322 and away from the second pig launching assembly connector 188 along the longitudinal axis 150, and at least one curved portion 340 (e.g., turn, bend, or arc) that extends between the first portion 336 and the second portion 338. In some embodiments, as illustrated, the pig conduit 322 may include two curved portions 340 and a third portion 342 that extends between the two curved portions 340 along the lateral axis 152. In certain embodiments, the bending radius of each curved portion 340 may be between approximately 1.5 and 5 times the diameter 328 of the respective curved portion 340. In certain embodiments, the bending radius of each curved portion 340 may be at least approximately 1.5, 2, 2.5, 3, 3.5, 4, 4.5, or 5 times the diameter 328 of the respective curved portion 340.

Figure 8A:
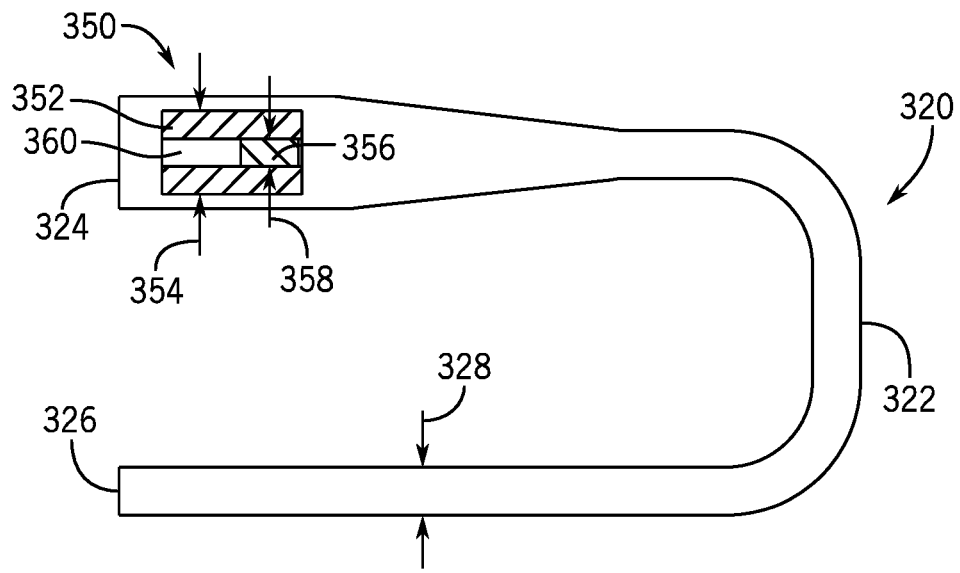
FIG. 8A is a cross-sectional view of a pig launching and receiving assembly having a pig assembly, where first and second pig portions of the pig assembly are coupled to one another, in accordance with one or more embodiments of the present disclosure.
Figure 8B:
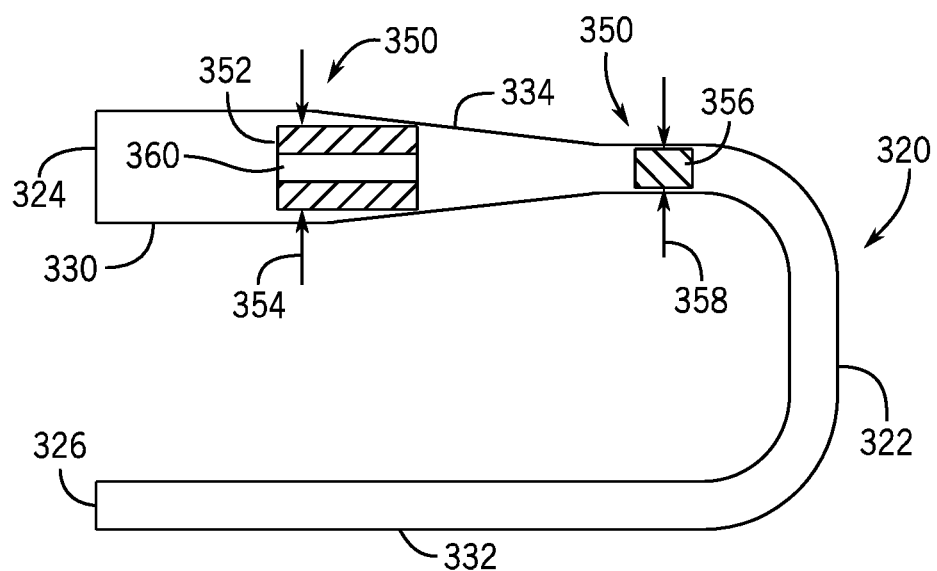
FIG. 8B is a cross-sectional view of the pig launching and receiving assembly and the pig assembly of FIG. 8A, where the first and second pig portions of the pig assembly are detached from each other, in accordance with one or more embodiments of the present disclosure.

The second pig launching and receiving assembly 320 may be configured to receive and/or launch a pig (e.g., an intelligent pig) having a dynamic diameter such that the pig may travel through the pig conduit 322 having the variable diameter 328. For example, in some embodiments, the second pig launching and receiving assembly 320 may receive (e.g., from the first or second pig launching assembly connectors 186 or 188) a pig that is configured to expand and/or contract to increase and/or decrease the diameter of the pig to fit within the variable diameter 328 of the pig conduit 322. In certain embodiments, the second pig launching and receiving assembly 320 may receive (e.g., from the first or second pig launching assembly connectors 186 or 188) a pig (e.g., a pig assembly) that includes a first pig portion having a first diameter and a second pig portion that has a second diameter coupled to the first pig portion. For example, FIGS. 8A and 8B are cross-sectional views of the second pig launching and receiving assembly 320 and a pig 350 (e.g., a pig assembly) having a dynamic diameter disposed in the pig conduit 224 of the second pig launching and receiving assembly 320. In particular, the pig 350 may include a first pig portion 352 (e.g., a parent pig) having a first diameter 354 and a second pig portion 356 (e.g., a child pig) having a second diameter 358 different from the first diameter 354. As illustrated in FIG. 8A, the first pig portion 352 and the second pig portion 356 may be coupled to one another. For example, in some embodiments, the second pig portion 356 may be inserted within an internal chamber 360 of the first pig portion 352 (e.g., in a coaxial or concentric arrangement). In certain embodiments, the first and second pig portions 352 and 356 may be coupled to one another via a tether.

As illustrated in FIG. 8B, the first and second pig portions 352 and 356 may be configured to separate from one another to enable the pig 350 (e.g., the second pig portion 356) to flow through the transition portion 334 of the pig conduit 322. For example, in some embodiments, the pig 350 may be an intelligent pig that may be configured to sense or detect a change in the variable diameter 328 of the pig conduit 322 and may be configured to separate or uncouple the first pig portion 352 from the second pig portion 356 when a change in the variable diameter 328 is detected. As illustrated in FIG. 8B, the first pig portion 352 may remain in the first constant diameter portion 330, while the second pig portion 356 may detach from the first pig portion 352 to flow through the transition portion 334 and the second constant diameter portion 332. It should be appreciated that in embodiments in which fluid flows from the second end 326 of the pig conduit 322 to the first end 324 of the pig conduit 322, the first and second pig portions 352 and 356 may be configured to couple to one another. For example, the second pig portion 356 may flow through the second constant diameter portion 332 and the transition portion 334 to couple to the first pig portion 352, which may be disposed in the first constant diameter portion 330.

In some embodiments, the diameter 354 of the first pig portion 352 may be greater than the first diameter 132 of the first rigid pipeline 126, the diameter 328 at the first end 324 of the pig conduit 322, and/or the diameter 328 of the first constant diameter portion 330 by at least approximately 25%, 15%, 10%, 5%, 4%, 3%, 2%, 1%, or any other suitable percentage. Further, in some embodiments, the diameter 358 of the second pig portion 356 may be greater than the second diameter 134 of the first flexible pipeline 128*a*, the third diameter 136 of the second flexible pipeline 128*b*, the diameter 328 at the second end 326 of the pig conduit 322, and/or the diameter 328 of the second constant diameter portion 332 by at least approximately 25%, 15%, 10%, 5%, 4%, 3%, 2%, 1%, or any other suitable percentage.

Figure 9:
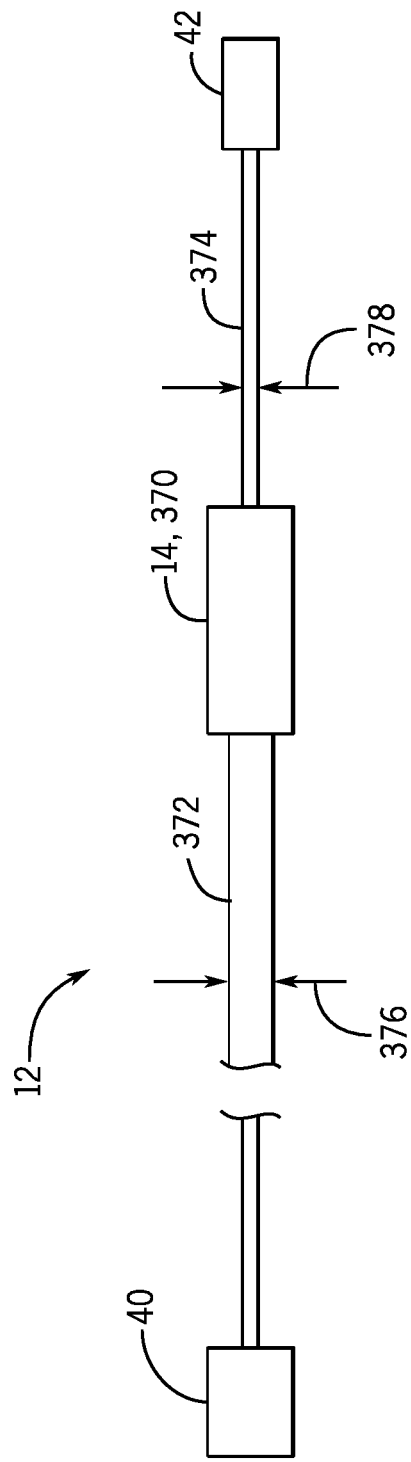
FIG. 9 is a schematic diagram of a subsea pipeline system including a tieback station, in accordance with one or more embodiments of the present disclosure.

FIG. 9 is a schematic view of an embodiment of the subsea pipeline system including the subsea pipeline station 14 configured to establish fluid communication between the first component 40 and the second component 42. In particular, in the illustrated embodiment, the subsea pipeline station 14 is a tieback station 370 (e.g., a long-distance tieback station, an in-line sled) configured to establish fluid communication when the first component 40 and the second component 42 are separated from one another by a large distance. As noted above, it may be desirable to use a larger diameter pipeline to convey fluids over a large distance. Accordingly, the tieback station 370 may establish fluid communication between a large rigid pipeline 372 and a small rigid pipeline 374. Specifically, a first diameter 376 (e.g., an outer diameter and/or an inner diameter) of the large rigid pipeline 372 may be greater than a second diameter 378 (e.g., an outer diameter and/or an inner diameter) of the small rigid pipeline 374. In some embodiments, the first diameter 376 may be at least approximately 2, 2.5, 3, 4, 5, or 10 times greater than the second diameter 378.

Figure 10:
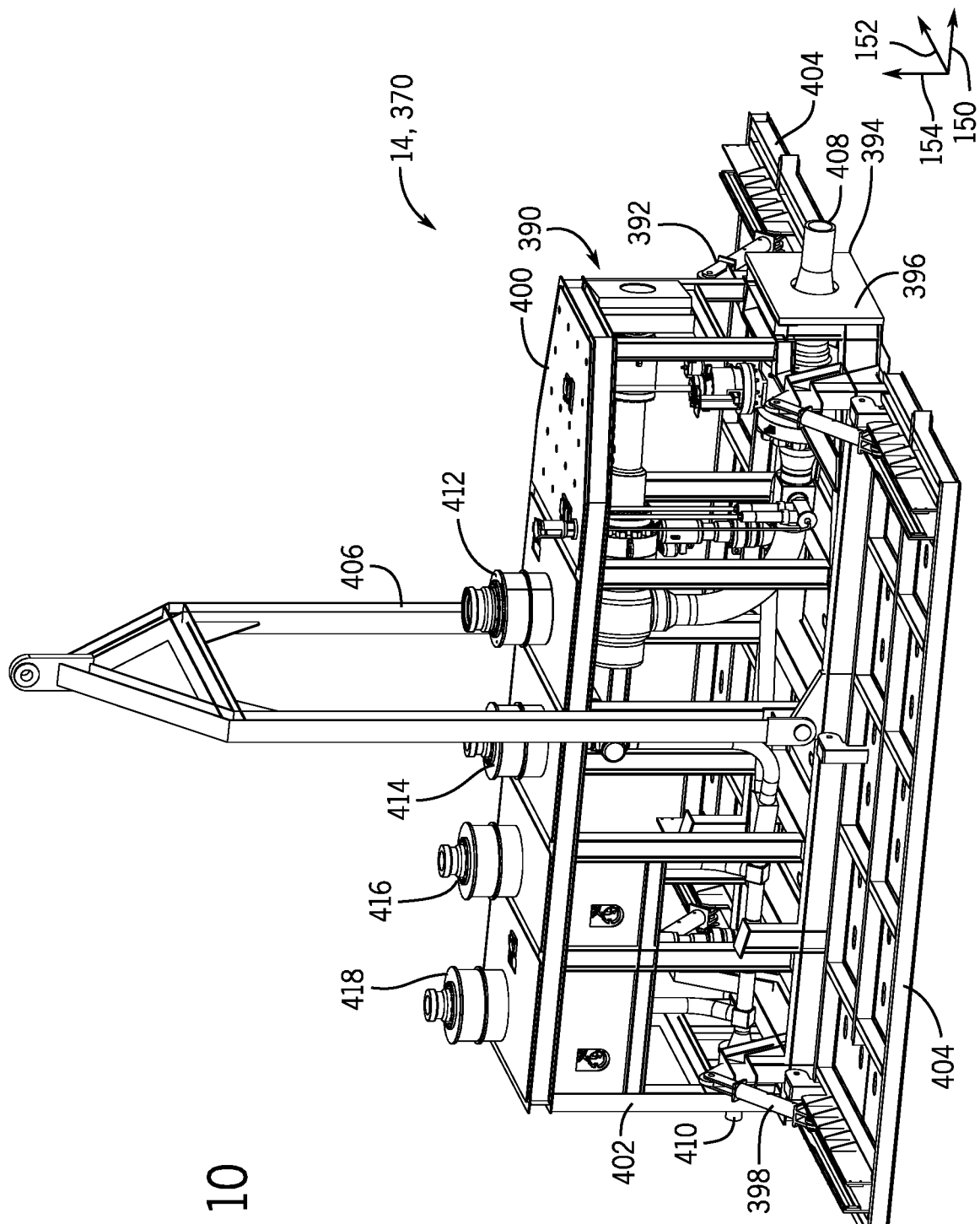
FIG. 10 is a perspective view of a tieback station including a frame and a header, in accordance with one or more embodiments of the present disclosure.

FIG. 10 illustrates a perspective view of an embodiment of the tieback station 370. The tieback station 370 includes a frame 390 and a header 392. As discussed in more detail below with respect to FIGS. 10 and 11, the header 392 may include a plurality of conduits, valves, and connectors to route a fluid through the tieback station 370 and/or through the pig launching and receiving assembly 60. The frame 390 may be configured to support the header 392 and protect the header from wear and damage. The frame 390 may include a base 394 (e.g., a mudmat) configured to be disposed on the sea floor when the tieback station 370 is installed or deployed. The base 394 may extend along the longitudinal axis 150 from a first end 396 to a second end 398. Additionally, the frame 390 may include a roof 400 disposed above the base 394 and a plurality of struts 402 (e.g., support structures, rods, bars, etc.) that each extend along the vertical axis 154 from the base 394 to the roof 400.

Additionally, the frame 390 may include a pair of lateral wings 404 coupled to the base 394. As illustrated, each wing of the pair of lateral wings 404 may extend away from the base 394 along the lateral axis 152 when the tieback station 370 is installed on the seafloor to provide stability. Additionally, the pair of lateral wings 404 may be configured to fold toward the roof 400 along the vertical and lateral axes 154 and 152 to reduce the footprint of the tieback station 370 during installation. Further, the frame 390 may include a yoke 406 to facilitate installation of the tieback station 370. The yoke 406 may be coupled to base 394 and may extend past the roof 400 along the vertical axis 154. The yoke 406 may be coupled to one or more buoyancy supports (e.g., static and/or dynamic) to provide stability during installation of the tieback station 370. Additionally, the yoke 406 attached to the buoyancy support may create an uprighting moment to block or prevent overturning of the tieback station 370 during installation and to enable the tieback station 370 to land in an upright position such that the base 394 is disposed on the sea floor.

The tieback station 370 (e.g., the header 392) may include two or more connectors to enable the tieback station 370 to couple to at least two rigid pipelines (e.g., the large rigid pipeline 372 and the small rigid pipeline 374). For example, the tieback station 370 may include a first connector 408 configured to couple to the large rigid pipeline 372 and a second connector 410 configured to couple to the small rigid pipeline 374. In some embodiments, the first and second connectors 408 and 410 may be pipe pups (e.g., a short piece of pipeline), which may be welded to the large rigid pipeline 372 and the small rigid pipeline 374. In particular, the first and second connectors 408 and 410 may be welded to the large rigid pipeline 372 and the small rigid pipeline 374, respectively, prior to installation of the tieback station 370. The first and second connectors 408 and 410 may be coupled to the base 394. As illustrated, in some embodiments, the first connector 408 may be coupled to and may extend away from the first end 396 of the base 394 along the longitudinal axis 150. Additionally, in some embodiments, the second connector 410 may be coupled to and may extend away from the second end 398 of the base 394 along the longitudinal axis 150.

Additionally, the tieback station 370 (e.g., the header 392) may include first and second pig launching assembly connectors 412 and 414, which may be configured to removably couple to the pig launching and receiving assembly 60. Further, in some embodiments, the tieback station 370 (e.g., the header 392) may include the first and second module connectors 416 and 418, which may be configured to removably couple to a module configured to modify a parameter of the fluid flowing through the tieback station 370. For example, the first and second module connectors 416 and 418 may be configured to removably couple to a boosting module 66 or a HIPPS 68. In certain embodiments, the first and second pig launching assembly connectors 412 and 414 and/or the first and second module connectors 418 and 416 may be coupled to or supported by the roof 400. For example, the first and second pig launching assembly connectors 412 and 414 and/or the first and second module connectors 418 and 416 may be disposed on the roof 400 and may extend away from the roof 400 and the base 394 along the vertical axis 154.

Figure 11:
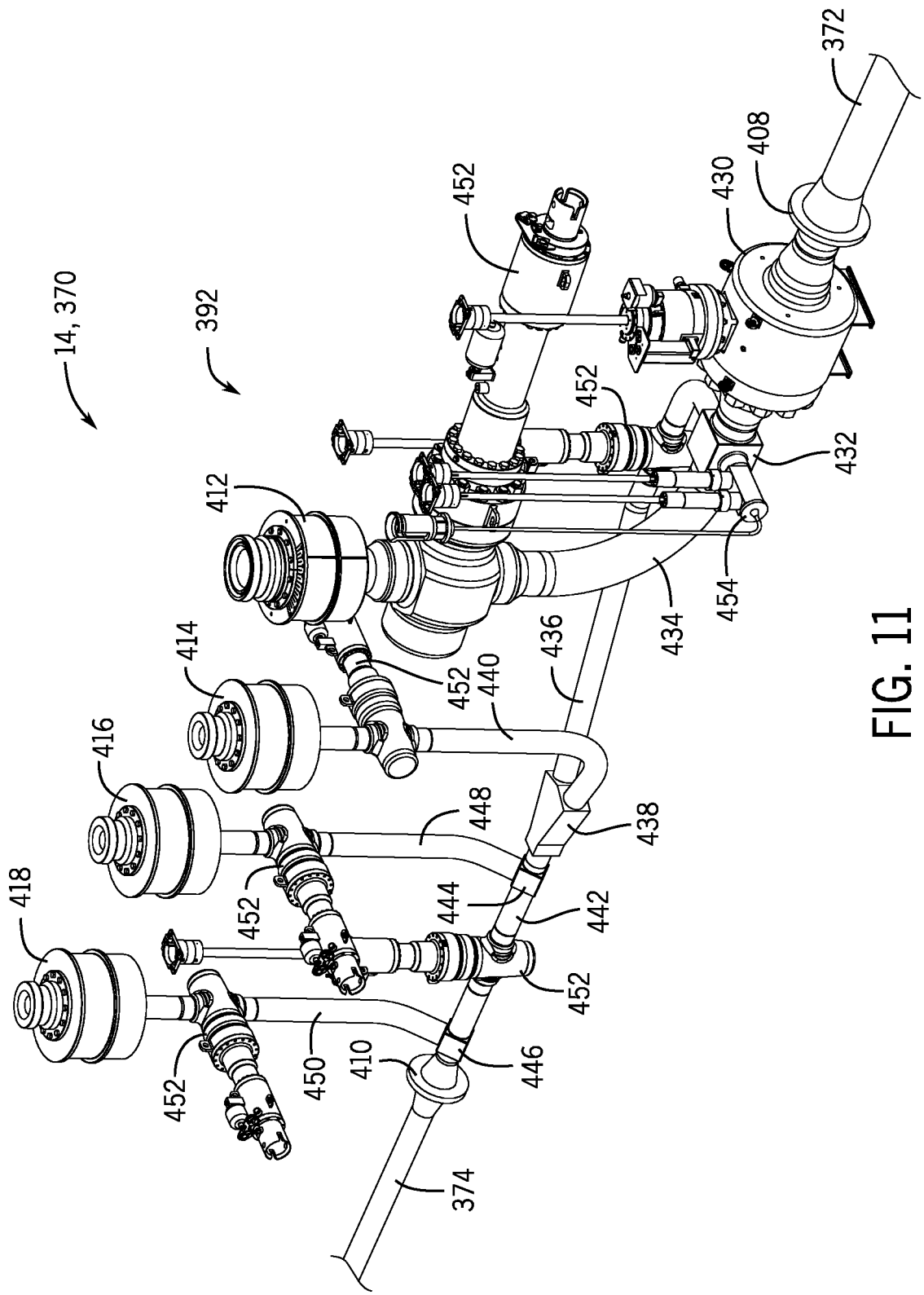
FIG. 11 is a perspective view of a header of a tieback station, in accordance with one or more embodiments of the present disclosure.

FIG. 11 illustrates a perspective view of an embodiment of the header 392 of the tieback station 370. As illustrated, the header 392 may include a first valve 430 (e.g., a ball valve, a one-way valve) configured to couple to the first connector 408. The first valve 430 may be configured to provide flow isolation by allowing fluid to flow through the first valve 430 when the first valve 430 is in an open position and by blocking or preventing the flow of fluid through the first valve 430 when the first valve 430 is in a closed position. The first valve 430 may be coupled to a first cross fitting 432 (e.g., a flow splitter), which may be coupled to a first conduit 434 and a second conduit 436.

The first conduit 434 may extend from the first cross fitting 434 to the first pig launching assembly connector 412. Additionally, the second conduit 436 may extend from the first cross fitting 432 to a piggable wye 438. The piggable wye 438 may also be coupled to a third conduit 440 and a fourth conduit 442. As illustrated, the third conduit 440 may extend from the piggable wye 438 to the second pig launching assembly connector 414. Further, the fourth conduit 442 may extend from the piggable wye 438 to the second connector 410, which may be coupled to the small rigid pipeline 374. Additionally, the header 392 may include second and third cross fittings 444 and 446 disposed in the fourth conduit 442. The second and third cross fittings 444 and 446 may couple the fourth conduit 442 to fifth and sixth conduits 448 and 450, respectively. In particular, the fifth conduit 448 may extend from the second cross fitting 444 to the first module connector 416, and the sixth conduit 450 may extend from the third cross fitting 446 to the second module connector 418. Additionally, in some embodiments, the header 392 may include a valve 452 disposed in each of the conduits 434, 436, 440, 442, 448, and 460 of the header 392 to provide flow isolation for the respective conduit. Further, in some embodiments, the header 392 may include at least one intervention point connector 454 (e.g., a valve and a hot stab), which may be configured to couple to a chemical line and/or a flushing device similar to the intervention point connectors 184 described in detail above.

In some embodiments, the first valve 430 and the second valves 452 may be mechanically actuated (e.g., by a person or by an underwater vehicle 102). In certain embodiments, the first valve 430 and the second valves 452 may be hydraulically actuated and/or electrically actuated. For example, in certain embodiments, a controller (e.g., the controller 80, the controller 88, and/or a controller of the underwater vehicle 102) may be configured to send hydraulic and/or electrical control signals to control the actuation of the first valve 430 and the second valves 452.

Figure 12:
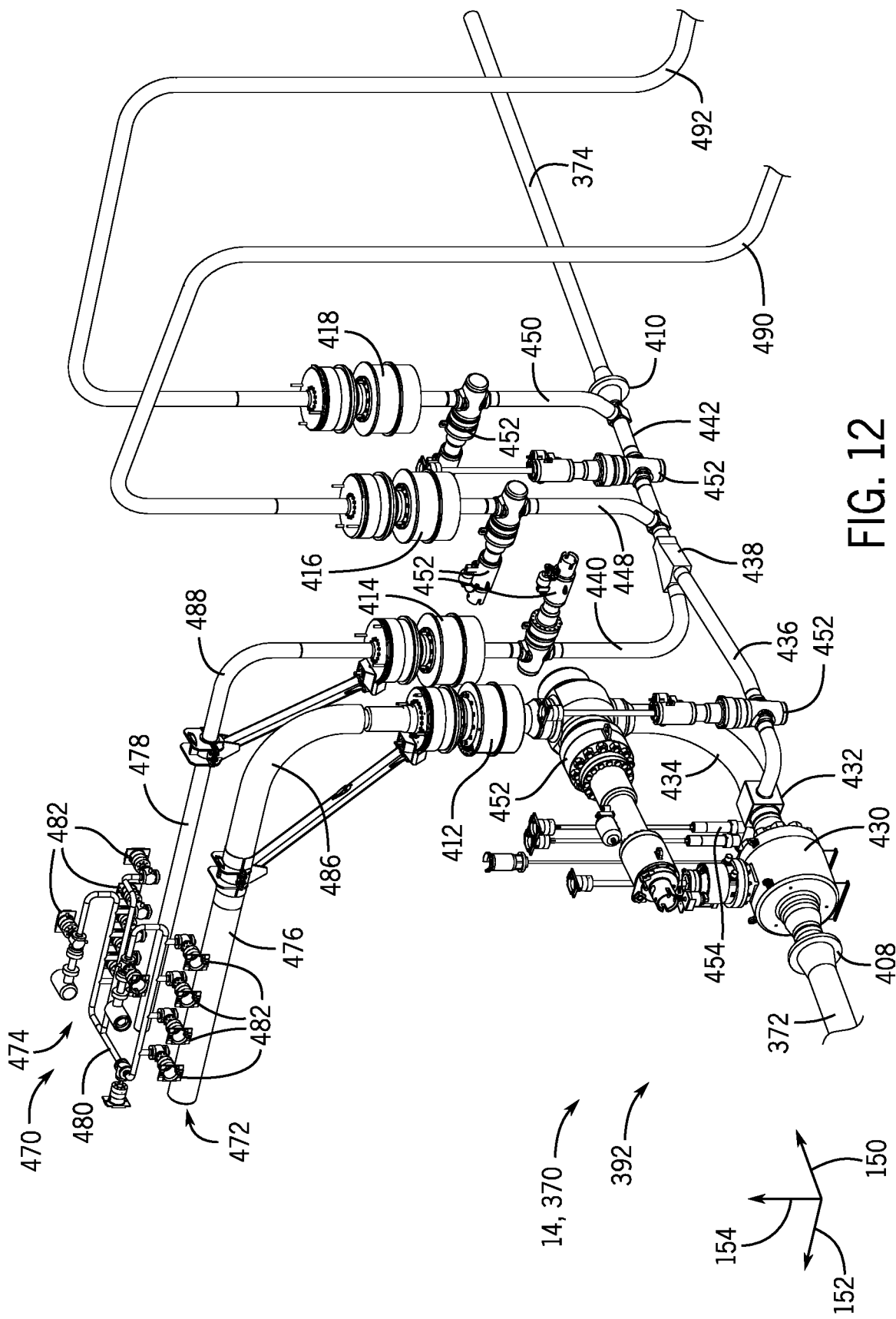
FIG. 12 is a perspective view of a header of a tieback station coupled to a pig launching and receiving assembly, in accordance with one or more embodiments of the present disclosure.

FIG. 12 illustrates a perspective view of an embodiment of the header 392 coupled to a first pig launching and receiving assembly 470 having a first configuration. The first pig launching and receiving assembly 470 having the first configuration may include substantially similar components to the first pig launching and receiving assembly 198 having the first configuration and may be configured operate in a substantially similar manner as the first pig launching and receiving assembly 198 having the first configuration. In particular, the first pig launching and receiving assembly 470 may include a first pig launcher and receiver 472 configured to receive and/or launch one or more pigs of a first diameter (e.g., a first constant diameter), and the first pig launching and receiving assembly 470 may include a second pig launcher and receiver 474 configured to receive and/or launch one or more pigs of a second diameter (e.g., a second constant diameter) different from the first diameter. Specifically, the first pig launcher and receiver 472 may include a first pig conduit 476 configured to contain one or more pigs (not shown) of the first diameter, and the second pig launcher and receiver 474 may include a second pig conduit 478 configured to contain one or more pigs (not shown) of the second diameter. Additionally, the first pig launching and receiving assembly 470 may include a conduit 480 configured to establish fluid communication between the first pig conduit 476 and the second pig conduit 478.

Further, the pig launching and receiving assembly 470 may include a plurality of valves 482 (similar to the first and second plurality of valves 282 and 284) configured to control the flow of fluid through the first pig launching assembly 470 and to control the launching of pigs from the first pig launching and receiving assembly 470. In some embodiments, the plurality of valves 482 may be mechanically actuated (e.g., by a diver or the underwater vehicle 102). In certain embodiments, the plurality of valves 482 may be hydraulically actuated and/or electrically actuated. In certain embodiments, a controller (e.g., the controller 80, the controller 88, and/or a controller of the underwater vehicle 102) may be configured to send hydraulic and/or electrical control signals to control the actuation of the plurality of valves 482 to control the launching of pigs from the first pig launching and receiving assembly 470. In some embodiments, the controller may control actuation of the plurality of valves 482 to control the launching of pigs based on sensor feedback received from one or more sensors of the first pig launching and receiving assembly 470 and/or from one or more sensors of the pigs (e.g., intelligent pigs). For example, the controller may send a signal to actuate a valve of the plurality of valves 482 to cause the second pig launcher and receiver 474 to launch a pig based on sensor feedback indicating that the first pig launcher and receiver 472 received a pig.

In some embodiments, the first and second pig conduits 476 and 478 may be coupled to the first and second pig launching assembly connectors 412 and 414, respectively, via first and second gooseneck connectors 486 and 488, respectively. Further, the first module connector 416 and the second module connector 418 may be configured to couple to an input conduit 490 and an output conduit 492, respectively. The input and output conduits 490 and 492 may be coupled to a boosting module 66, HIPPS 68, or any other suitable device.

The tieback station 370 may be configured to receive fluid from the large rigid pipeline 372 and to convey the fluid to the small rigid pipeline 374 or may be configured to receive fluid from the small rigid pipeline 374 and to convey the fluid to the large rigid pipeline 372. While the following description relates to an embodiment in which the tieback station 370 receives fluid and pigs from the large rigid pipeline 372 and conveys the fluid to the small rigid pipeline 374, it should be appreciated that the direction of the fluid and pigs through the tieback station 370 may be reversed for embodiments in which the tieback station 370 receives fluid and pigs from the small rigid pipeline 374.

Further, as discussed in more detail below, the first valve 430, the first conduit 434, the valve 452 in the first conduit 434, the first gooseneck connector 486, and the first pig conduit 476 may be configured to convey one or more pigs having a first diameter that is sized to fit within the large rigid pipeline 372. For example, the first diameter of the one or more pigs may be greater than the diameter (e.g., inner diameter) of the first valve 430, the first conduit 434, the valve 452 in the first conduit 434, the first gooseneck connector 486, and the first pig conduit 476 by approximately 25%, 20%, 15%, 10%, 5%, 4%, 3%, 2%, 1%, or any other suitable percentage. Additionally, as discussed below, the second pig conduit 478, the second gooseneck connector 488, the third conduit 440, the valve 452 in the third conduit 440, the fourth conduit 442, and the valve 452 in the fourth conduit 442 may be configured to convey one or more pigs having a second diameter that is sized to fit within the small rigid pipeline 374. For example, the second diameter of the one or more pigs may be greater than the diameter (e.g., inner diameter) of the second pig conduit 478, the second gooseneck connector 488, the third conduit 440, the valve 452 in the third conduit 440, the fourth conduit 442, and the valve 452 in the fourth conduit 442, by approximately 25%, 20%, 15%, 10%, 5%, 4%, 3%, 2%, 1%, or any other suitable percentage.

During operation, the first rigid pipeline 372 may convey fluid and, optionally, a pig having the first diameter to the first valve 430. The first valve 430 (e.g., in the open position) may convey the fluid and the pig to the first conduit 434 through the first cross fitting 432. When pigging is desired, the valve 452 in the first conduit 434 may be actuated to the open position to enable the fluid and the pig to flow to the first pig conduit 476 through the first gooseneck connector 486. If pigging is not desired, the valve 452 in the first conduit 434 may be actuated to the closed position to bypass the first pig launcher and receiver 472. For the reverse flow, the valve 452 in the third conduit 440 may be actuated to the closed position to bypass second pig launcher and receiver 474. The second pig launcher and receiver 474 may be configured to receive fluid from first pig launcher and receiver 472 via the conduit 480 and may be configured to launch a pig having the second diameter from the second pig conduit 478.

The pig and the fluid may flow through the second gooseneck connector 488 to the third conduit 440. Additionally, the first valve 430 may convey the fluid to the second conduit 436 through the first cross fitting 432. The fluid from the second conduit 436 and the fluid and the pig from the third conduit 440 may then flow through the wye diverter 438 to the fourth conduit 442. During pigging, the valves 452 in the fifth and sixth conduits 448 and 450 may be actuated to the closed position to bypass the module (e.g., a boosting module 66 or HIPPS 68) coupled to the first and second module connectors 416 and 418. As such, the fluid and the pig may flow through the fourth conduit 440 to the small rigid pipeline 374.

In certain embodiments, the valves 452 in the fifth and sixth conduits 448 and 450 may be actuated to the open position to route fluid and from the module coupled to the first and second module connectors 416 and 418. In particular, the fifth conduit 448 may convey fluid to the input conduit 490, which may route the fluid to the module. Additionally, the sixth conduit 450 may receive fluid from the output conduit 492, which may route fluid from the module. As discussed above, the module may be configured to modify a parameter of the fluid, such as pressure, temperature, chemical composition, and so forth. The sixth conduit 450 may then route the fluid (e.g., fluid having a modified parameter) to the small rigid pipeline 374. In some embodiments, the valves 452 in the fifth and sixth conduits 448 and 450 may be actuated to the open position when the fluid from the third conduit 440 does not contain a pig or when the valve 452 in the third conduit 440 is in the closed position to block pigs from flowing to the module.

Further, the first and second module connectors 416 and 418 may be removably coupled to input and output conduits 490 and 492 to enable the tieback station 370 to couple to different modules. Additionally, the first and second module connectors 416 and 418 may be removably coupled to the input and output conduits 490 and 492 while the tieback station 370 is installed on the seafloor. Similar to the valves of the crossing station 124, the first valve 430 and the second valves 452 of the tieback station 370 may be actuated to reduce, block, or prevent flooding of the conduits of the tieback station 370 when a module is engaged or disengaged from the first and second module connectors 416 and 418.

Figure 13:
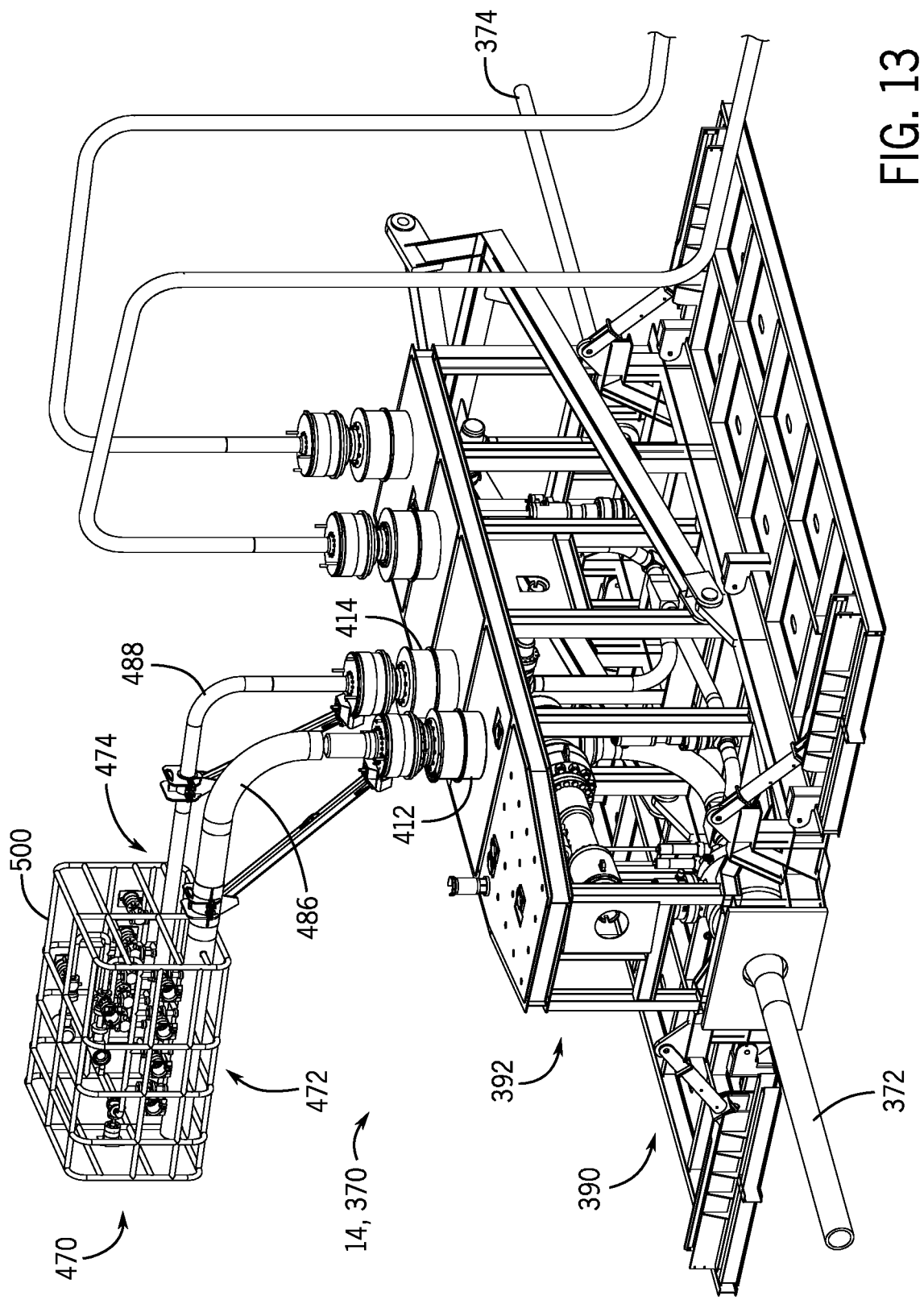
FIG. 13 is a perspective view of a tieback station coupled to a pig launching and receiving assembly, in accordance with one or more embodiments of the present disclosure.

FIG. 13 illustrates a perspective view of the tieback station 370 coupled to the first pig launching and receiving assembly 470 having the first configuration. In particular, as illustrated, the first gooseneck connector 486 may couple the first pig launcher and receiver 472 of the first pig launching and receiving assembly 470 to the first pig launching and receiving assembly connector 412, and the second gooseneck connector 488 may couple the second pig launcher and receiver 474 of the first pig launching and receiving assembly 470 to the second pig launching and receiving assembly connector 414. Additionally, in some embodiments, the first pig launching and receiving assembly 470 may include a frame 500 surrounding the first pig launcher and receiver 472 and the second pig launcher and receiver 474.

Figure 14:
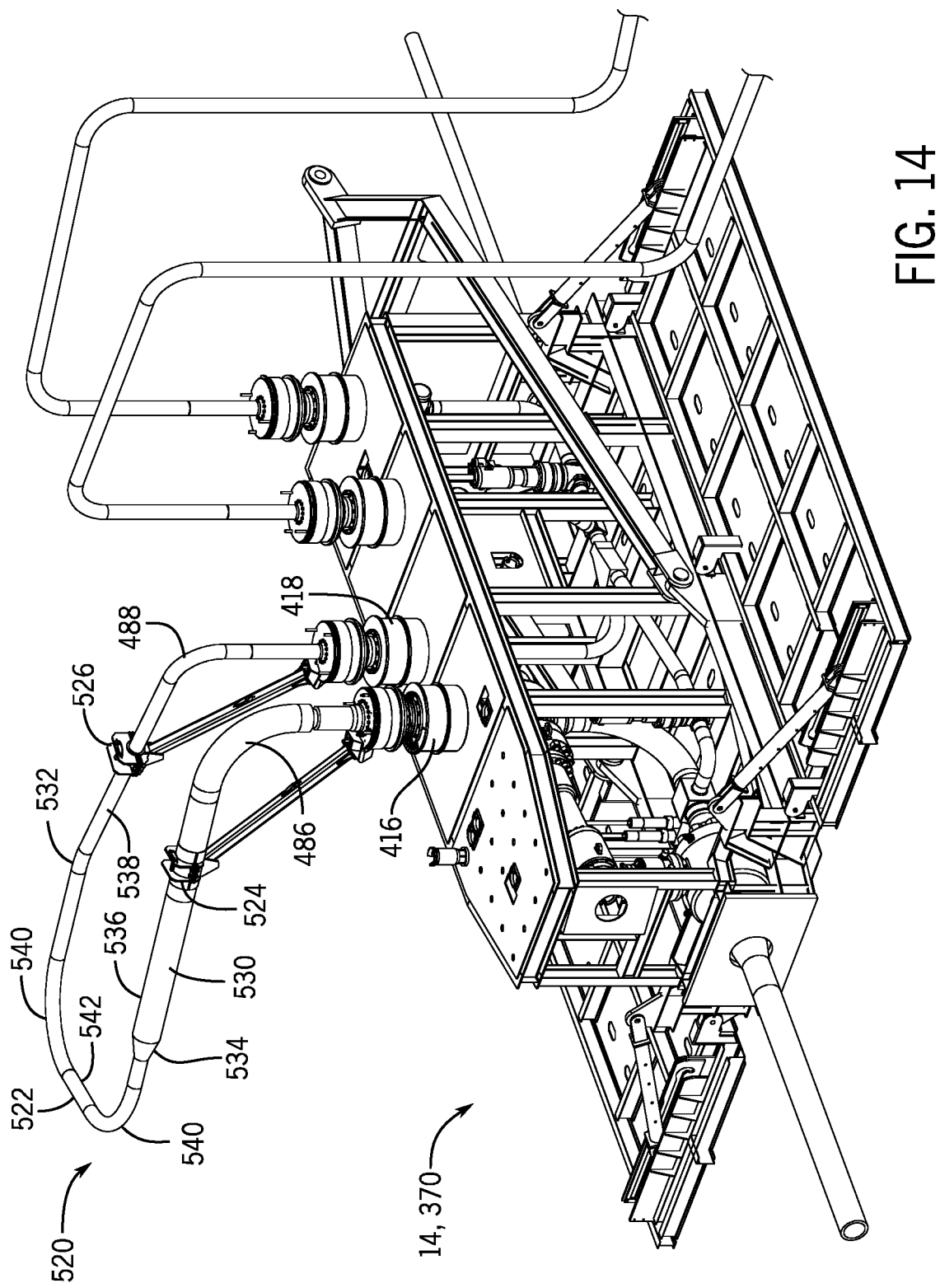
FIG. 14 is a perspective view of a tieback station coupled to a pig launching and receiving assembly, in accordance with one or more embodiments of the present disclosure.

FIG. 14 illustrates a perspective view of the tieback station 370 coupled to a second pig launching and receiving assembly 520 having a second configuration. In particular, as illustrated, the first and second gooseneck connectors 486 and 488 may couple the second pig launching and receiving assembly 520 to the first and second pig launching and receiving assembly connectors 412 and 414, respectively.

The second pig launching and receiving assembly 520 having the second configuration may include substantially similar components to the second pig launching and receiving assembly 320 having the second configuration and may be configured operate in a substantially similar manner as the second pig launching and receiving assembly 320 having the second configuration.

As illustrated, the second pig launching and receiving assembly 520 may include a pig conduit 522 coupled to the first and second gooseneck connectors 486 and 488. In particular, a first end 524 of the pig conduit 522 may be coupled to the first gooseneck connector 486, and a second end 526 of the pig conduit 522 may be coupled to the second gooseneck connector 488. The pig conduit 322 may include a variable diameter (e.g., an inner diameter) that varies from the first end 524 to the second end 526 such that the diameter at the first end 524 is different from the diameter at the second end 526. In some embodiments, the diameter at the first end 524 may be within approximately ±10%, ±5%, ±4%, ±3%, ±2%, or ±1% of the diameter 376 of the large rigid pipeline 372, and the diameter at the second end 526 may be within approximately ±10%, ±5%, ±4%, ±3%, ±2%, or ±1% of the diameter 378 of the small rigid pipeline 374.

In some embodiments, the pig conduit 522 may include a first constant diameter portion 530 that extends from the first gooseneck connector 486, a second constant diameter portion 532 that extends from the second gooseneck connector 488, and a transition portion 534 that extends between the first constant diameter portion 530 and the second constant diameter portion 532. As illustrated, in some embodiments, the transition portion 534 may be a tapered portion (e.g., a tapered annular portion or a conical portion) where the diameter gradually changes (e.g., increases or decreases). In certain embodiments, the transition portion 534 may be a stepped portion where the diameter abruptly changes. In some embodiments, the diameter of the first constant diameter portion 530 may be within approximately ±10%, ±5%, ±4%, ±3%, ±2%, or ±1% of the diameter 376 of the large rigid pipeline 372. Further, in some embodiments, the diameter of the second constant diameter portion 532 may be within approximately ±10%, ±5%, ±4%, ±3%, ±2%, or ±1% of the diameter 378 of the small rigid pipeline 374.

As illustrated, the pig conduit 522 (e.g., a pig loop) may be generally shaped as a loop (e.g., curved, u-shaped, arc-shaped, etc.) to couple to both the first and second gooseneck connectors 486 and 488. For example, in some embodiments, the pig conduit 522 may include a first portion 536 that extends away from the first gooseneck connector 486 along the lateral axis 152, a second portion 538 that extends away from the second gooseneck connector 488 along the lateral axis 152, and at least one curved portion 540 that extends between the first portion 536 and the second portion 538. In some embodiments, as illustrated, the pig conduit 522 may include two curved portions 540 and a third portion 542 that extends between the two curved portions 540 along the longitudinal axis 150. In certain embodiments, the bending radius of each curved portion 540 may be between approximately 1.5 and 5 times the diameter of the respective curved portion 340. In certain embodiments, the bending radius of each curved portion 540 may be at least approximately 1.5, 2, 2.5, 3, 3.5, 4, 4.5, or 5 times the diameter of the respective curved portion 340.

The second pig launching and receiving assembly 520 may be configured to receive and/or launch one or more pigs (e.g., intelligent pigs) each having a dynamic or variable diameter similar to the second pig launching and receiving assembly 320. For example, in some embodiments, the first end 524 of the pig conduit 522 may be configured to receive a pig (e.g., a pig assembly, an intelligent pig) that includes a first pig portion (e.g., a parent pig) having a first diameter and a second pig portion (e.g., a child pig) that has a second diameter (e.g., a smaller diameter) coupled to the first pig portion. The second pig portion may be configured to separate from the first pig portion while the pig is in the pig conduit 522, and the second pig launching and receiving assembly 520 may be configured to convey or launch the second pig portion through the second end 526 of the pig conduit 522. In certain embodiments, the second pig launching and receiving assembly 520 may receive a pig configured to expand and/or contract to increase and/or decrease the diameter of the pig as the pig travels through the pig conduit 522.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

The invention claimed is:

1. A subsea pipeline station configured to establish fluid communication between a first pipeline and a second pipeline, the subsea pipeline station comprising:
   a first pig launching and receiving assembly comprising first and second pig conduits;
   a second pig launching and receiving assembly comprising a curved pig conduit;
   a first connector configured to couple to the first pipeline, wherein the first pipeline comprises a first diameter;
   a second connector configured to couple to the second pipeline, wherein the second pipeline comprises a second diameter different from the first diameter; and
   a third connector and a fourth connector, wherein the third and fourth connectors are configured to removably couple to the first and second pig conduits, respectively, of the first pig launching and receiving assembly in a first configuration, wherein the third and fourth connectors are configured to removably couple to first and second ends, respectively, of the curved pig conduit of the second pig launching and receiving assembly in a second configuration, wherein the first and second configurations are different from one another;
   wherein the subsea pipeline station is configured to receive a first pig from the first pig launching and receiving assembly and to convey the first pig to the first pipeline or the second pipeline when the subsea pipeline station is coupled to the first pig launching and receiving assembly, wherein the subsea pipeline station is configured to receive a second pig from the second pig launching and receiving assembly and to convey the second pig to the first pipeline or the second pipeline when the subsea pipeline station is coupled to the second pig launching and receiving assembly, wherein the first pig comprises a fixed diameter, wherein the second pig comprises a dynamic diameter.

2. The subsea pipeline station of claim 1, wherein the first diameter is at least 1.5 times greater than the second diameter.

3. The subsea pipeline station of claim 1, wherein the first pig launching and receiving assembly is configured to transport the first pig through the first pig conduit and the first pipeline, the first pig launching and receiving assembly is configured to transport a third pig through the second pig conduit and the second pipeline, the first pig conduit is fluidly coupled to the second pig conduit via an intermediate conduit, and the first and third pigs are structurally separated from one another at least by the intermediate conduit.

4. The subsea pipeline station of claim 1, wherein the second pig comprises a first pig portion and a second pig portion removably coupled to the first pig portion, wherein the second pig portion is configured to separate from the first pig portion to modify the dynamic diameter of the second pig.

5. The subsea pipeline station of claim 4, wherein the second pig portion is configured to be inserted into and removed from an internal chamber of the first pig portion.

6. The subsea pipeline station of claim 1, comprising:
a fifth connector configured to couple to a third pipeline, wherein the third pipeline comprises a third diameter different from the first diameter, and wherein the subsea pipeline station is configured to establish fluid communication between the first pipeline and the third pipeline;
a first conduit extending between the first connector and the third connector;
a wye diverter coupled to the fourth connector;
a second conduit extending from the wye diverter to the second connector; and
a third conduit extending from the wye diverter to the fifth connector.

7. The subsea pipeline station of claim 6, wherein the wye diverter is configured to:
selectively route the first pig to the second conduit or the third conduit when the subsea pipeline station is coupled to the first pig launching and receiving assembly; and
selectively route the second pig to the second conduit or the third conduit when the subsea pipeline station is coupled to the second pig launching and receiving assembly.

8. The subsea pipeline station of claim 1, comprising a fifth connector configured to couple to a third pipeline, wherein the third pipeline comprises a third diameter different from the first diameter, and wherein the subsea pipeline station is configured to establish fluid communication between the first pipeline and the third pipeline, wherein the subsea pipeline station is configured to selectively enable or block fluid communication between the first pipeline and the second pipeline and between the first pipeline and the third pipeline.

9. The subsea pipeline station of claim 1, comprising one or more hot stab connectors, wherein each hot stab connector of the one or more hot stab connectors is configured to couple to a chemical injection line configured to inject one or more chemicals into a fluid flowing through the subsea pipeline station.

10. The subsea pipeline station of claim 1, wherein the third and fourth connectors are configured to removably couple to a pressure boosting module or to a high-integrity pressure protection system, wherein the pressure boosting module is configured to increase a pressure of a fluid flowing through the subsea pipeline station, and wherein the high-integrity pressure protection system is configured to decrease the pressure of the fluid if the pressure exceeds a threshold.

11. The subsea pipeline station of claim 1, comprising a sixth connector and a seventh connector, wherein the sixth and seventh connectors are configured to removably couple to a pressure boosting module or to a high-integrity pressure protection system, wherein the pressure boosting module is configured to increase a pressure of a fluid flowing through the subsea pipeline station, and wherein the high-integrity pressure protection system is configured to decrease the pressure of the fluid if the pressure exceeds a threshold.

12. The subsea pipeline station of claim 1, comprising at least one valve, wherein the subsea pipeline station is configured to route a fluid to the first pig launching and receiving assembly or the second pig launching and receiving assembly when the at least one valve is in a first position, and wherein the subsea pipeline station is configured to block the fluid from flowing to the first pig launching and receiving assembly or the second pig launching and receiving assembly when the at least one valve is in a second position.

13. A subsea pipeline system, comprising:
a first pig launching and receiving assembly;
a second pig launching and receiving assembly, wherein the first and second pig launching and receiving assemblies are structurally different from one another;
a first pipeline comprising a first diameter;
a second pipeline comprising a second diameter different from the first diameter;
a subsea pipeline station coupled to the first pipeline and the second pipeline, wherein the subsea pipeline station is configured to:
establish fluid communication between the first pipeline and the second pipeline;
receive a first pig from the first pig launching and receiving assembly and convey the first pig to the first pipeline or the second pipeline when the subsea pipeline station is coupled to the first pig launching and receiving assembly in a first configuration, wherein the first pig comprises a fixed diameter; and
receive a second pig from the second pig launching and receiving assembly and convey the second pig to the first pipeline or the second pipeline when the subsea pipeline station is coupled to the second pig launching and receiving assembly in a second configuration, wherein the first and second configurations are different from one another, and the second pig comprises a dynamic diameter.

14. The subsea pipeline system of claim 13, wherein the first diameter is at least two times greater than the second diameter.

15. The subsea pipeline system of claim 13, wherein the second pig comprises a first pig portion and a second pig portion removably coupled to the first pig portion, wherein the second pig portion is configured to separate from the first pig portion to modify the dynamic diameter of the second pig.

16. The subsea pipeline system of claim 13, wherein the first pig launching and receiving assembly comprises a first pig launcher and receiver that supports the first pig to transport the first pig along the first pipeline, the first pig launching and receiving assembly comprises a second pig launcher and receiver that supports a third pig to transport the third pig along the second pipeline, and the first and third pigs are structurally blocked from one another.

17. The subsea pipeline system of claim 16, wherein the first pig launcher and receiver is disposed along a first pig conduit and the second pig launcher and receiver is disposed along a second pig conduit, the first pig conduit is fluidly coupled to the second pig conduit via an intermediate conduit, and the first and third pigs are structurally separated from one another at least by the intermediate conduit.

18. A method comprising:
coupling a first pipeline and a second pipeline to a pipeline station configured to establish fluid communication between the first pipeline and the second pipeline, wherein the first pipeline comprises a first diameter, and the second pipeline comprises a second diameter different from the first diameter;
coupling a first pig launching and receiving assembly to the pipeline station in a first configuration, wherein the first pig launching and receiving assembly is configured to receive a first pig and to convey the first pig to the first pipeline or the second pipeline when the pipeline station is coupled to the first pig launching and receiving assembly, and the first pig comprises a fixed diameter; and
coupling a second pig launching and receiving assembly to the pipeline station in a second configuration, wherein the first and second pig launching and receiving assemblies are structurally different from one another, wherein the second pig launching and receiving assembly is configured to receive a second pig and to convey the second pig to the first pipeline or the second pipeline when the pipeline station is coupled to the second pig launching and receiving assembly, wherein the first and second configurations are different from one another, and the second pig comprises a dynamic diameter.

19. The method of claim 18, wherein the first pig launching and receiving assembly comprises a first pig launcher and receiver that supports the first pig to transport the first pig along the first pipeline, the first pig launching and receiving assembly comprises a second pig launcher and receiver that supports a third pig to transport the third pig along the second pipeline, and the first and third pigs are structurally blocked from one another.

20. The method of claim 19, wherein the first pig launcher and receiver is disposed along a first pig conduit and the second pig launcher and receiver is disposed along a second pig conduit, the first pig conduit is fluidly coupled to the second pig conduit via an intermediate conduit, and the first and third pigs are structurally separated from one another at least by the intermediate conduit.

* * * * *